(12) United States Patent
Enders et al.

(10) Patent No.: US 8,083,254 B2
(45) Date of Patent: Dec. 27, 2011

(54) KNEE AIRBAG ASSEMBLIES CONFIGURED FOR INFLATOR INSERTION AND INFLATOR-MEDIATED COUPLING TO AN AIRBAG HOUSING

(75) Inventors: Mark L. Enders, Pleasant View, UT (US); Louis Mueller, Roy, UT (US); Larry Lunt, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 207 days.

(21) Appl. No.: 12/430,562

(22) Filed: Apr. 27, 2009

(65) Prior Publication Data

US 2010/0270775 A1    Oct. 28, 2010

(51) Int. Cl.
*B60R 21/217* (2011.01)
(52) U.S. Cl. ............... 280/728.2; 280/730.1; 280/743.2
(58) Field of Classification Search ............... 280/730.1, 280/728.2, 732, 743.1, 743.2
See application file for complete search history.

(56) References Cited

U.S. PATENT DOCUMENTS

| | | |
|---|---|---|
| 3,858,822 A | 1/1975 | Wood |
| 4,290,627 A | 9/1981 | Cumming et al. |
| 5,338,061 A | 8/1994 | Nelson et al. |
| 5,344,184 A | 9/1994 | Keeler et al. |
| 5,427,410 A | 6/1995 | Shiota et al. |
| 5,460,400 A | 10/1995 | Davidson |
| 5,529,337 A | 6/1996 | Takeda et al. |
| 5,669,627 A | 9/1997 | Marjanski et al. |
| 5,765,867 A | 6/1998 | French |
| 5,772,239 A | 6/1998 | Seymour |
| 5,810,390 A | 9/1998 | Enders et al. |
| 5,823,566 A | 10/1998 | Manire |
| 5,845,935 A | 12/1998 | Enders et al. |
| 5,927,748 A | 7/1999 | O'Driscoll |
| 6,059,312 A | 5/2000 | Staub et al. |
| 6,155,595 A | 12/2000 | Schultz |
| 6,213,496 B1 | 4/2001 | Minami et al. |

(Continued)

FOREIGN PATENT DOCUMENTS

DE   20 2006 014 012   8/2006

(Continued)

OTHER PUBLICATIONS

Office Action mailed Oct. 29, 2010 in co-pending U.S. Appl. No. 12/430,246, now published as U.S. Publication No. US 2010/0270782.

(Continued)

*Primary Examiner* — Drew Brown
(74) *Attorney, Agent, or Firm* — Stoel Rives LLP

(57) ABSTRACT

An airbag assembly with a reduced-cost knee airbag cushion and internal tethers can be formed from a single rectangular panel of material so that there is very little material waste. A pleat can be formed in a rear face so that the combination of tethers and pleat help the cushion deploy with favorable characteristics and adopt an arced shape when inflated. The cushion can have apertures for inserting an inflator with mounting stems partially within the cushion so that the mounting stems can be used to couple the cushion to an airbag housing. The assembly can also have a bag strap formed from a single piece of fabric that can wrap around a rolled and/or folded cushion. The assembly can also have a stabilizer strap that can be coupled to the cushion and to the airbag housing so that during deployment, the cushion does not skew or twist.

30 Claims, 17 Drawing Sheets

U.S. PATENT DOCUMENTS

| | | | |
|---|---|---|---|
| 6,217,059 B1 | 4/2001 | Brown et al. | |
| 6,224,129 B1 | 5/2001 | Cisternino et al. | |
| 6,254,121 B1 | 7/2001 | Fowler et al. | |
| 6,299,205 B1 | 10/2001 | Keshavaraj | |
| 6,364,348 B1 | 4/2002 | Jang et al. | |
| 6,431,583 B1 | 8/2002 | Schneider | |
| 6,454,296 B1 | 9/2002 | Tesch et al. | |
| 6,464,255 B1 | 10/2002 | Preisler et al. | |
| 6,474,686 B1 | 11/2002 | Higuchi et al. | |
| 6,494,484 B2 | 12/2002 | Bosgieter et al. | |
| 6,682,093 B2 | 1/2004 | Tajima et al. | |
| 6,685,217 B2 | 2/2004 | Abe | |
| 6,715,789 B2 | 4/2004 | Takimoto et al. | |
| 6,752,417 B2 | 6/2004 | Takimoto et al. | |
| 6,846,005 B2 | 1/2005 | Ford et al. | |
| 6,945,557 B2 | 9/2005 | Takimoto et al. | |
| 6,959,944 B2 | 11/2005 | Mori et al. | |
| 6,962,363 B2 | 11/2005 | Wang et al. | |
| 6,962,366 B2 | 11/2005 | Fukuda et al. | |
| 7,000,947 B2 | 2/2006 | Kumagai et al. | |
| 7,029,026 B2 | 4/2006 | Morita | |
| 7,055,851 B2 | 6/2006 | Takimoto et al. | |
| 7,131,664 B1 | 11/2006 | Pang et al. | |
| 7,147,247 B2 | 12/2006 | Hayakawa | |
| 7,156,418 B2 | 1/2007 | Sato et al. | |
| 7,175,195 B2 | 2/2007 | Morita | |
| 7,182,365 B2 | 2/2007 | Takimoto et al. | |
| 7,185,912 B2 | 3/2007 | Matsuura et al. | |
| 7,195,275 B2 | 3/2007 | Abe | |
| 7,195,280 B2 | 3/2007 | Wheelwright et al. | |
| 7,201,396 B2 | 4/2007 | Takimoto et al. | |
| 7,226,077 B2 * | 6/2007 | Abe | 280/736 |
| 7,232,149 B2 | 6/2007 | Hotta et al. | |
| 7,261,318 B2 | 8/2007 | Enders | |
| 7,281,734 B2 | 10/2007 | Abe et al. | |
| 7,314,228 B2 | 1/2008 | Ishiguro et al. | |
| 7,314,230 B2 | 1/2008 | Kumagai et al. | |
| 7,347,444 B2 | 3/2008 | Wheelwright | |
| 7,370,881 B2 | 5/2008 | Takimoto et al. | |
| 7,374,201 B2 | 5/2008 | Chausset | |
| 7,374,202 B2 | 5/2008 | Lim | |
| 7,380,813 B2 | 6/2008 | Lanzinger et al. | |
| 7,384,065 B2 | 6/2008 | Takimoto et al. | |
| 7,387,311 B2 | 6/2008 | Kanno et al. | |
| 7,396,044 B2 | 7/2008 | Bauer et al. | |
| 7,434,837 B2 | 10/2008 | Hotta et al. | |
| 7,549,672 B2 | 6/2009 | Sato et al. | |
| 7,566,074 B2 | 7/2009 | Hawthorn et al. | |
| 7,568,724 B2 | 8/2009 | Kutchey et al. | |
| 7,568,730 B2 | 8/2009 | Kwon | |
| 7,631,894 B2 | 12/2009 | Hasebe et al. | |
| 7,658,408 B2 | 2/2010 | Zofchak et al. | |
| 7,658,409 B2 | 2/2010 | Ford et al. | |
| 7,695,013 B2 | 4/2010 | Kakstis et al. | |
| 7,712,769 B2 | 5/2010 | Hasebe et al. | |
| 7,717,460 B2 | 5/2010 | Franke et al. | |
| 7,744,118 B2 | 6/2010 | Takimoto et al. | |
| 7,748,739 B2 | 7/2010 | Brinker | |
| 7,753,405 B2 | 7/2010 | Ishiguro et al. | |
| 7,753,407 B2 | 7/2010 | Yokota | |
| 7,766,374 B2 * | 8/2010 | Abele et al. | 280/730.1 |
| 7,793,973 B2 | 9/2010 | Sato et al. | |
| 7,819,419 B2 | 10/2010 | Hayashi et al. | |
| 7,878,540 B2 * | 2/2011 | Takimoto et al. | 280/743.2 |
| 2001/0007391 A1 | 7/2001 | Hamada et al. | |
| 2002/0044819 A1 | 4/2002 | Shamoon | |
| 2002/0149187 A1 | 10/2002 | Holtz et al. | |
| 2002/0171231 A1 | 11/2002 | Takimoto et al. | |
| 2003/0034637 A1 | 2/2003 | Wang et al. | |
| 2003/0209888 A1 | 11/2003 | Davis, Jr. et al. | |
| 2005/0001412 A1 | 1/2005 | Schneider et al. | |
| 2005/0057028 A1 | 3/2005 | Hayakawa | |
| 2005/0062265 A1 | 3/2005 | Hotta et al. | |
| 2005/0151351 A1 | 7/2005 | Enders et al. | |
| 2005/0194767 A1 | 9/2005 | Freisler et al. | |
| 2005/0194771 A1 | 9/2005 | Clark et al. | |
| 2005/0212275 A1 | 9/2005 | Hasebe | |
| 2005/0230939 A1 | 10/2005 | Abe et al. | |
| 2006/0279073 A1 | 12/2006 | Hotta et al. | |
| 2007/0057487 A1 | 3/2007 | Kim | |
| 2007/0120346 A1 | 5/2007 | Kwon | |
| 2007/0200321 A1 | 8/2007 | Heitplatz et al. | |
| 2007/0246920 A1 * | 10/2007 | Abele et al. | 280/730.1 |
| 2008/0157509 A1 | 7/2008 | Abe et al. | |
| 2008/0217892 A1 | 9/2008 | Maripudi et al. | |
| 2008/0238048 A1 | 10/2008 | Ishida | |
| 2009/0045607 A1 | 2/2009 | Fukuyama et al. | |
| 2009/0058048 A1 | 3/2009 | Ishida et al. | |
| 2009/0085333 A1 | 4/2009 | Imaeda et al. | |
| 2009/0134611 A1 | 5/2009 | Wigger et al. | |
| 2009/0152842 A1 | 6/2009 | Benny et al. | |
| 2009/0184498 A1 * | 7/2009 | Takimoto et al. | 280/730.1 |
| 2009/0212541 A1 | 8/2009 | Wallat et al. | |
| 2010/0090445 A1 * | 4/2010 | Williams et al. | 280/728.2 |
| 2010/0270775 A1 | 10/2010 | Enders et al. | |
| 2010/0270779 A1 * | 10/2010 | Enders et al. | 280/730.1 |
| 2010/0270782 A1 * | 10/2010 | Enders et al. | 280/730.1 |
| 2011/0012327 A1 | 1/2011 | Enders | |

FOREIGN PATENT DOCUMENTS

| | | |
|---|---|---|
| WO | WO 2010/126623 | 11/2010 |
| WO | WO-2011/008916 | 1/2011 |

OTHER PUBLICATIONS

Notification of Transmittal of the International Search Report and the Written Opinion of the International Searching Authority mailed Jan. 3, 2011 in International Application No. PCT/US2010/055197.

Restriction Requirement mailed Sep. 15, 2010 in co-pending U.S. Appl. No. 12/430,246.

Amendment and Response to Requirement for Election of Species filed Oct. 12, 2010 in co-pending U.S. Appl. No. 12/430,246.

Preliminary Amendment filed Aug. 31, 2009 in co-pending U.S. Appl. No. 12/504,544.

Preliminary Amendment filed Jul. 15, 2010 in co-pending U.S. Appl. No. 12/504,544.

Notification of Transmittal of the International Search Report and the Written Opinion of the International Searching Authority mailed Mar. 30, 2010 in International Application No. PCT/US2010/021343.

Notification of Transmittal of the International Search Report and the Written Opinion of the International Searching Authority mailed Sep. 23, 2010 in International Application No. PCT/US2010/042070.

Co-pending U.S. Appl. No. 12/430,274, titled Inflatable Knee Airbags and Internal Tethers Produced From Single Panels of Material, filed Apr. 27, 2009.

Co-pending U.S. Appl. No. 12/430,246, titled Inflatable Knee Airbags Assemblies With Bag Straps for Wrapping the Airbags and Optimizing Deployment, filed Apr. 27, 2009.

Co-pending U.S. Appl. No. 12/645,130, titled Inflatable Airbag Assembly With an Integral Cover, filed Dec. 22, 2009.

Co-pending U.S. Appl. No. 12/504,544, titled Inflatable Knee Airbag Having Two Chambers Separated by an Internal Tether, filed Jul. 16, 2009.

Co-pending U.S. Appl. No. 12/611,676, titled Low-Mount Inflatable Knee Airbags Having Serial Chambers, filed Nov. 3, 2009.

Co-pending U.S. Appl. No. 12/872,323, titled Covers for Inflatable Knee Airbag Housings, filed Aug. 31, 2010.

Co-pending U.S. Appl. No. 12/872,946, titled Inflatable Knee Airbag Assemblies With Articulating Housings, filed Aug. 31, 2010.

Office Action mailed Jan. 21, 2011 in co-pending U.S. Appl. No. 12/430,274, now published as U.S. Publication No. US 2010/0270779.

Office Action mailed Dec. 13, 2010 in co-pending U.S. Appl. No. 12/504,544, now published as U.S. Publication No. US 2011/0012327.

Notification of Transmittal of the International Search Report and the Written Opinion of the International Searching Authority mailed Feb. 18, 2011 in International Application No. PCT/US2010/061744.

Notification of Transmittal of the International Search Report and the Written Opinion of the International Searching Authority mailed Jan. 3, 2011 in International Application No. PCT/US2010/055197.

* cited by examiner

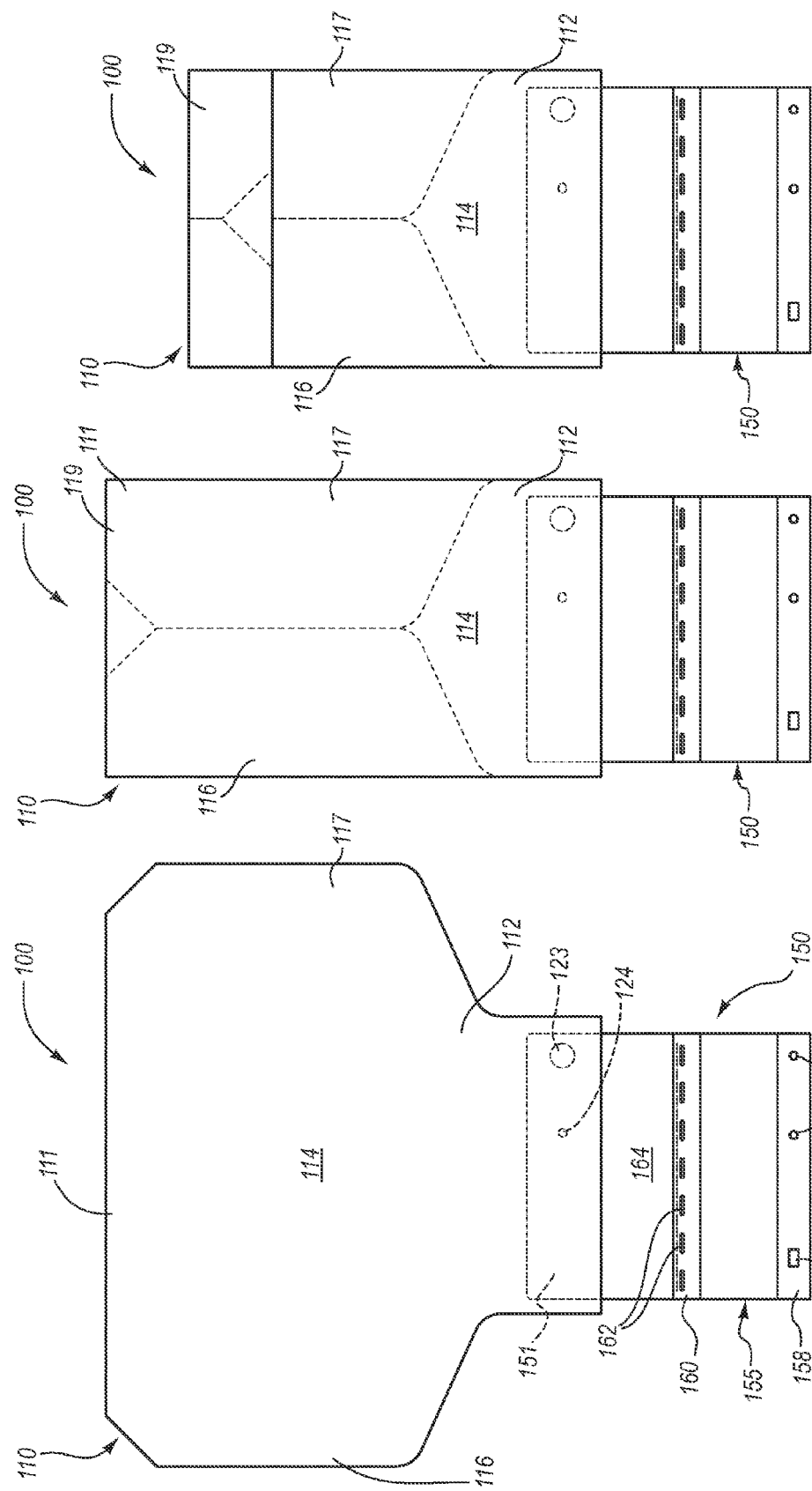

KNEE AIRBAG ASSEMBLIES CONFIGURED FOR INFLATOR INSERTION AND INFLATOR-MEDIATED COUPLING TO AN AIRBAG HOUSING

TECHNICAL FIELD

The present disclosure relates generally to the field of automotive protective systems. More specifically, the present disclosure relates to inflatable airbag cushion assemblies, such as knee airbags.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

FIG. 11A is a rear elevation view of the airbag assembly of FIG. 2, wherein the airbag cushion is in an extended configuration prior to being subjected to a method for folding an airbag cushion.

FIG. 11B is a rear elevation view of the airbag assembly of FIG. 11A after side portions of the airbag cushion have been tucked in accordance with a method for folding an airbag cushion.

FIG. 11C is a rear elevation view of the airbag assembly of FIG. 11B after a top portion of the airbag cushion has been folded in accordance with a method for folding an airbag cushion.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position.

In the following disclosure, "airbag" may refer to an inflatable curtain airbag, overhead airbag, front airbag, or any other airbag type.

Front airbags are typically installed in the steering wheel and instrument panel of a vehicle. During installation, the airbags are rolled, folded, or both, and are retained in the rolled/folded state behind a cover. During a collision event, vehicle sensors trigger the activation of an inflator, which rapidly fills the airbag with inflation gas. Thus the airbag rapidly changes confirmations from the rolled/folded configuration to an expanded configuration.

Figure 1A:
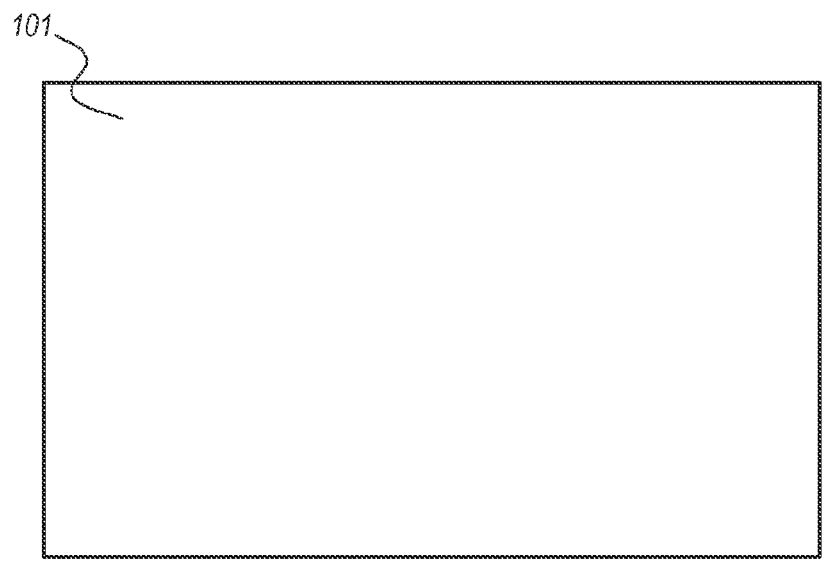
FIG. 1A is a top elevation view of a panel of material from which a portion of an airbag cushion may be formed, which in turn, comprises a portion of an airbag assembly.
Figure 1B:
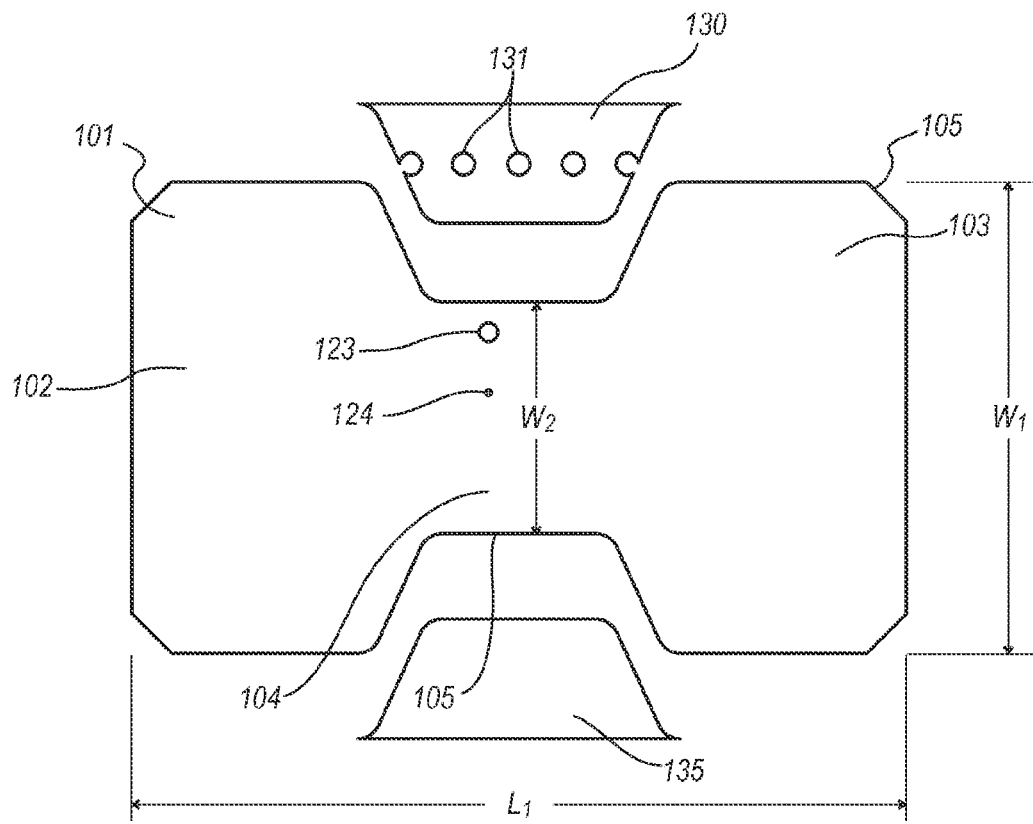
FIG. 1B is a top elevation view of the panel of material of FIG. 1A after portions of the panel have been removed.

FIGS. 1A-1B are a top elevation views of a panel of material 101 from which a portion of an airbag cushion may be formed. Panel 101 comprises a sheet of fabric that may comprise a woven nylon material, or any other material that is well known in the art. Panel 101 comprises a rectangular shape that is defined by a perimeter 105 and has a first portion 102, a second portion 103, and a middle portion 104. First tether 130 and second tether 135 may be cut from the middle portion of panel 101 such that after being cut, panel 101 may be said to have an "I" or "H" shape. The length and/or width of panel 101 may be varied according to different embodiments. For example, width $W_1$ may be from about 400 mm to about 600 mm and length $L_1$ may be from about 600 mm to 900 mm.

FIG. 1B depicts panel 101 after first and second tethers 130 and 135 have been cut from panel 101, after which a second width $W_2$ is defined by the middle portion 104. $W_2$ may be from about 250 mm to about 550 mm. Width $W_2$ of middle portion 104 may comprise about 110% of the width of an airbag housing of airbag assembly 100. An inflator insert aperture 123 and an inflator mounting stem aperture 124 may be formed in middle portion 104 by cutting, stamping, or as a result of the employment of a one-piece-weaving technique. FIG. 1B depicts the corners of panel 101 as being trimmed compared to the corners of the panel as shown in FIG. 1A; however, the corners may be trimmed or not. Embodiments of an inflatable airbag cushion formed from a panel that does not have trimmed corners may have a perimeter seam that angles across the panel's corners, as sown in FIG. 1B, in which case an inflatable void of the cushion may comprise corners similar to those sown in FIG. 1B.

Figure 2:
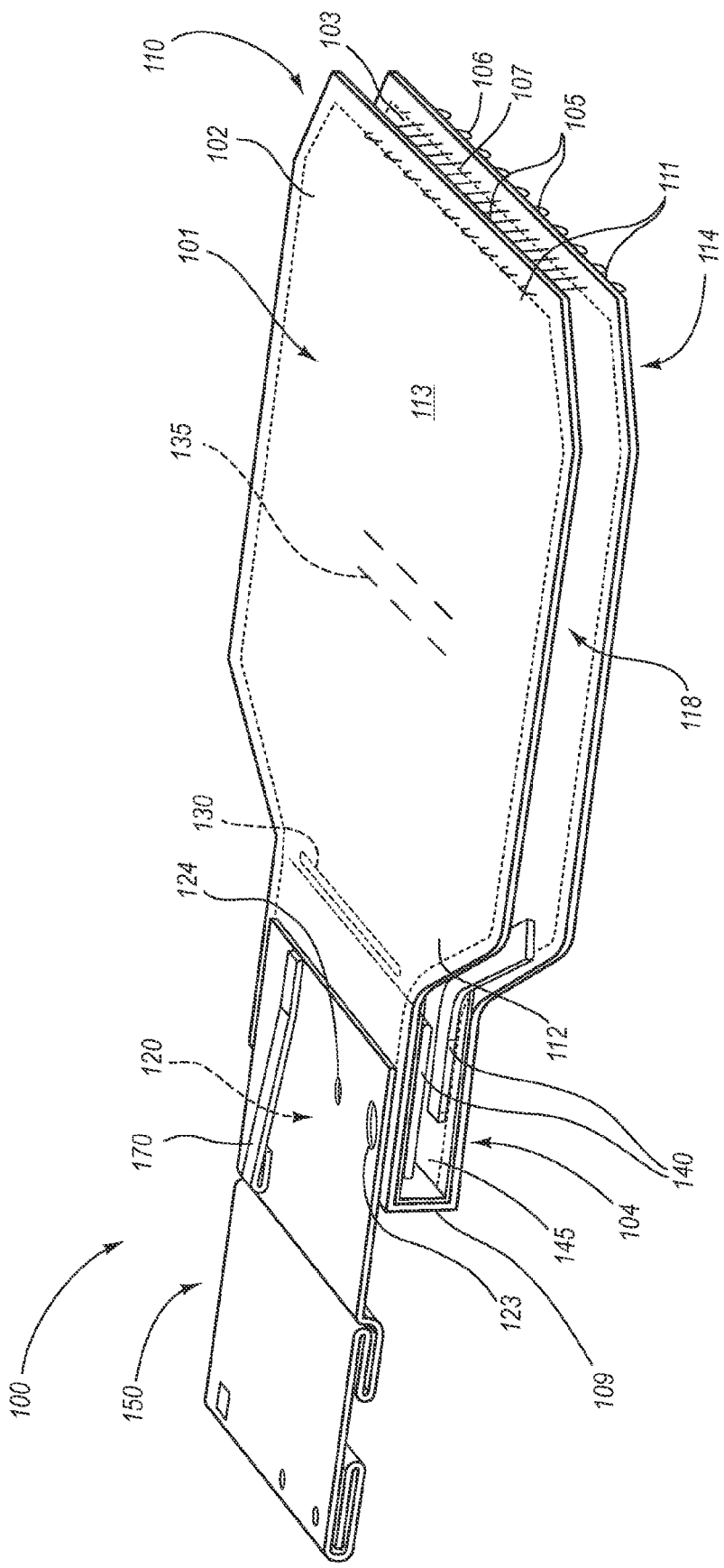
FIG. 2 is a bottom perspective view of a portion of an embodiment of an airbag assembly.
Figure 3:
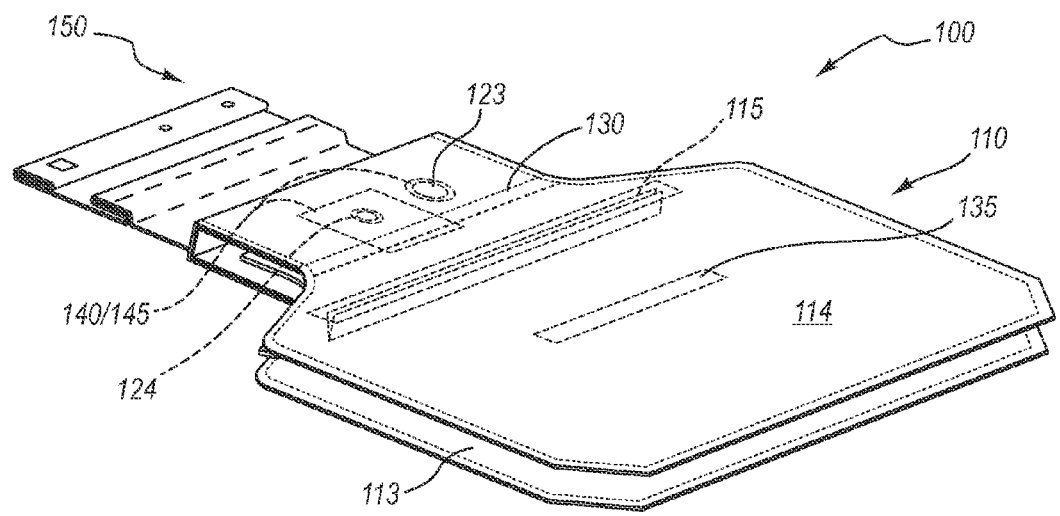
FIG. 3 is a top perspective view of the airbag assembly of FIG. 2 after the assembly has been rotated 180 degrees.
Figure 4:
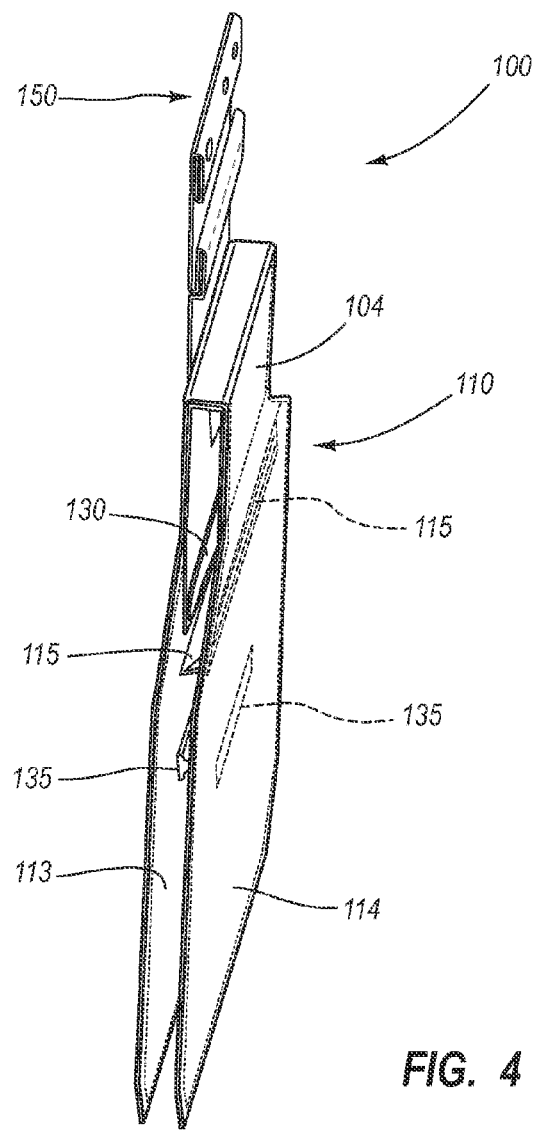
FIG. 4 is a rear perspective view of the airbag assembly of FIG. 2.

FIGS. 2-4 are perspective views of a portion of airbag assembly 100, wherein FIG. 2 is a bottom perspective view, FIG. 3 is a top perspective view, and FIG. 4 is a side perspective view. Assembly 100 may comprise a cushion 110, a first tether 130, a second tether 135, reinforcements 140, heat panels 145, a bag strap 150, and a stabilizer strap 170. After the first and second tethers have been cut from panel of material 101 the panel may be folded at middle portion 104 to form a fold 109. When panel 101 is folded, first portion 102 and second portion 103 are brought in close proximity such that the planes of the first and second portions are in a substantially parallel orientation. Fold 109 may comprise one or more discrete folds, or the fold may comprise a more general "U" shape.

Once membrane 101 is folded, stitching 106 may be applied around perimeter 105 such that the first and second portions 102 and 103 are coupled together. After being folded and stitched together, it may be said that panel of material 101 has been configured as an inflatable airbag cushion membrane 110. As such, the cushion membrane has an inflatable void 118. For clarity in depicting various structures and characteristics of assembly 100, in some of the following figures, cushion 110 is shown without the perimeter being sewn together.

Cushion membrane 110 may described as having an upper portion 111, a lower portion 112, a front face 113, and a rear face 114. Upper portion 111 of cushion 110 is the portion of the cushion that is closest to the headliner of a vehicle when the cushion is in a deployed state. Lower portion 112 is below upper portion 111 when cushion 110 is in a deployed state, and is closest to a floor of the vehicle. The term "lower portion" is not necessarily limited to the portion of cushion 110 that is below a horizontal medial plane of the cushion, but may include less than half, more than half or exactly half of the bottom portion of the cushion. Likewise, the term "upper portion" is not necessarily limited to the portion of cushion 110 that is above a horizontal medial plane of the cushion, but may include less than half, more than half or exactly half of the top portion of the cushion.

As will be appreciated by those skilled in the art, a variety of types and configurations of airbag cushion membranes can be utilized without departing from the scope and spirit of the present disclosure. For example, the size, shape, and proportions of the cushion membrane may vary according to its use in different vehicles or different locations within a vehicle. Also, the cushion membrane may comprise one or more pieces of any material well known in the art, such as a woven nylon fabric. Additionally, the airbag cushion may be manufactured using a variety of techniques such as one piece weaving, "cut and sew", or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Once the panel of material has been configured as an inflatable cushion 110, the cushion may be coupled with additional components to form an inflatable airbag cushion assembly 100, as depicted in FIG. 2. Bag strap 150, stabilizer strap 170, and first tether 130 have been coupled to membrane 101 at middle portion 104. Second tether 135 is coupled to membrane 101 closer to upper portion 111 than first tether 130. First and second tethers 130 and 135 are coupled to front face 113 and extend to, and are coupled to, rear face 114. In other words, the first and second tethers are located between the front and rear faces such that the tethers may be said to be located within the inflatable void of the inflatable airbag cushion. First and second tethers 130 and 135 may be coupled to coupled to front and rear faces 113 and 114 by stitching, or any other suitable technique.

Each tether may not be symmetrically attached to the cushion membrane on the front face and the rear face. For example, the portions of the first and second tethers that are coupled to the rear face of the membrane may be located between about 20 mm and 30 mm closer to fold 109 than the portions of the first and second tethers that are coupled to the front face of the membrane. In other words, the point at which the first and second tethers are coupled to the front face of the inflatable cushion membrane may be located more towards the upper portion of the cushion that the point at which the first and second tethers are coupled to the rear face of the inflatable cushion.

First tether 130 may be located between middle portion 104 and first and second portions 102 and 103 and may be oriented such that the tether runs transversely across the middle portion of cushion 110. In one embodiment, the first tether runs the entire width of the cushion, from perimeter to perimeter. First tether 130 may comprise one or more apertures (131), as depicted in FIG. 1, wherein the apertures are configured to allow inflation gas to pass from a first side of the first tether to a second side of the tether. First tether 130 may be described as running transversely across a majority of the width of cushion 110 and is coupled to front and rear faces 113 and 114 of the cushion. First tether 130 is positioned within cushion 110 such that when the cushion is deployed, the first tether is located outside the housing. First tether 130 may be located between the inflator (not shown) and a portion of inflatable void 118, such that the plurality of apertures may allow inflation gas to pass from an inflator-proximal side of the tether to an inflator distal side of the tether. As such, the apertures may allow inflation gas to flow from the inflator into the inflatable void. The apertures may each comprise a diameter of about 33 mm and may be sewn concentrically using a single needle lock stitch with about a 3 mm off-set.

Second tether 135 may be located between about 33% to about 50% the distance from first tether 130 to a top edge of upper portion 111 of cushion 110. Generally, the second tether may be about 50% the width as the airbag cushion. For example, in one embodiment, the second tether is about 250 mm wide and the inflatable airbag cushion is about 500 mm wide.

Bag strap 150 may comprise a piece of woven fabric that is coupled to attachment portion 120 of cushion 110. Attachment portion 120 is located on front face 113 at middle portion 104. As such, bag strap 150 is coupled to front face 113 of cushion 110, and may be coupled to the cushion via stitching or any other suitable technique. Bag strap 150 may aid in retaining cushion 110 in a packaged configuration; in obtaining favorable airbag cushion deployment characteristics; and in coupling the cushion to an airbag housing.

One or more reinforcements 140 may be placed at high stress points in assembly 100, wherein the reinforcements comprise one or more pieces of fabric that may the same or different than the fabric from which cushion 110 is formed. For example, one or more reinforcements may be sewn into perimeter seam 107 near where middle portion 104 of cushion 110 extends to become lower portion 112 of front and rear faces 113 and 114. Additionally, one or more layers of reinforcement may be coupled to cushion 110 at an attachment area 120, near inflator apertures 123 and 124, wherein the reinforcement may comprise the same material or a different material than reinforcement 140.

Heat resistant fabric 145 may be coupled near the inflator attachment area 120 and may be employed in addition to or instead of reinforcements at inflator apertures 123 and 124. The heat resistant fabric may comprise a plain woven fiberglass material with a silicone coating, wherein the fiberglass strands in the fabric comprise E-glass, S-glass, or S2-glass grades of fiberglass. If present, the silicone coating may be applied to one side of the fabric and the fabric oriented within assembly 100 such that the silicone coated side faces the inflator.

One skilled in the art will recognize that a variety of types and configurations of heat resistant materials and coatings, as well as reinforcements may be employed without diverging from the spirit of the present disclosure. For example, the fabric need not be plain woven, but may have a more random fiber orientation of sun bond material. Also, the heat resistant material may comprise one or more of a variety of different fibers such as para-aramid synthetic fibers that are sold as Kevlar brand fibers, carbon, hemp, nylon, and polyester. Further, the heat resistant coating may comprise one or more materials such as neoprene, urethane, phenolic materials, and other flexible epoxies. In some embodiments, the reinforcement material and the heat resistant material may comprise the same material.

FIG. 3 depicts a portion of airbag assembly 100 from a top perspective view, wherein the airbag assembly has been rotated 180° from the view of FIG. 2. In this view, front face 113 of cushion 110 is below rear face 114, and the dashed outlines of first and second tethers 130 and 135 are visible. Also shown are inflator insert aperture 123, inflator stem aperture 124, and the dashed outline of reinforcement and/or heat shield 140/145.

A pleat 115 may be formed in rear panel 114, such that the rear panel is not as long as front panel 113. In other words, a distance from the upper portion 111 to the lower portion 112 is smaller for rear face 114 than front face 113. Pleat 115 is located between first and second tethers 130 and 135 and may be formed by folding rear panel 114 back upon itself such that a fold of cushion membrane 110 is created that extends into inflatable void 118 in the direction of front panel 113. Pleat 115 may retained by employing a double needle chain stitch. The pleat may be gradually formed and retained in cushion 110 by creating two arcs of stitching at each end of the pleat and a straight stitch in the middle of the pleat, or in another embodiment, the ends of the pleat may be stitched such that the pleat is tapered at its ends. In another embodiment, the stitch and pleat may form a single radius arc.

The portion of the pleat that extends toward the front face may have a length of about 20 mm, in which case the rear panel is shortened about 40 mm. In another embodiment, the pleat extends about 50 mm such that the rear panel is shortened about 100 mm. The width of the full depth portion of pleat 115 may correspond to the width of first and second tethers 130 and 135 such that the portion of the pleat that is the full depth is about as wide as the tethers. In one embodiment, the airbag cushion is about 500 mm wide, the tethers are about 240 mm wide, and the full depth portion of the pleat is also about 240 mm wide, although the entire pleat extends about 400 mm.

First tether 130, second tether 135, and pleat 115 are configured to aid the inflatable cushion membrane in following a predetermined deployment trajectory. Additionally, the tethers and the pleat may be configured such that the inflatable cushion adopts a predetermined shape during deployment and upon full or substantially full inflation. For example, when fully or substantially inflated, the inflatable cushion may be variously described as adopting an approximately "C" shape, a banana shape, or a crescent shape.

FIG. 4 is a perspective view of a portion of airbag assembly 100, which depicts cushion 110, first tether 130, second tether 135, pleat 115, and bag strap 150. Portions of the first and second tethers are visible between front and rear faces 113 and 114. Bag strap 150 is coupled to front face 113 of cushion 110 at middle portion 104 of the cushion.

Figure 5:
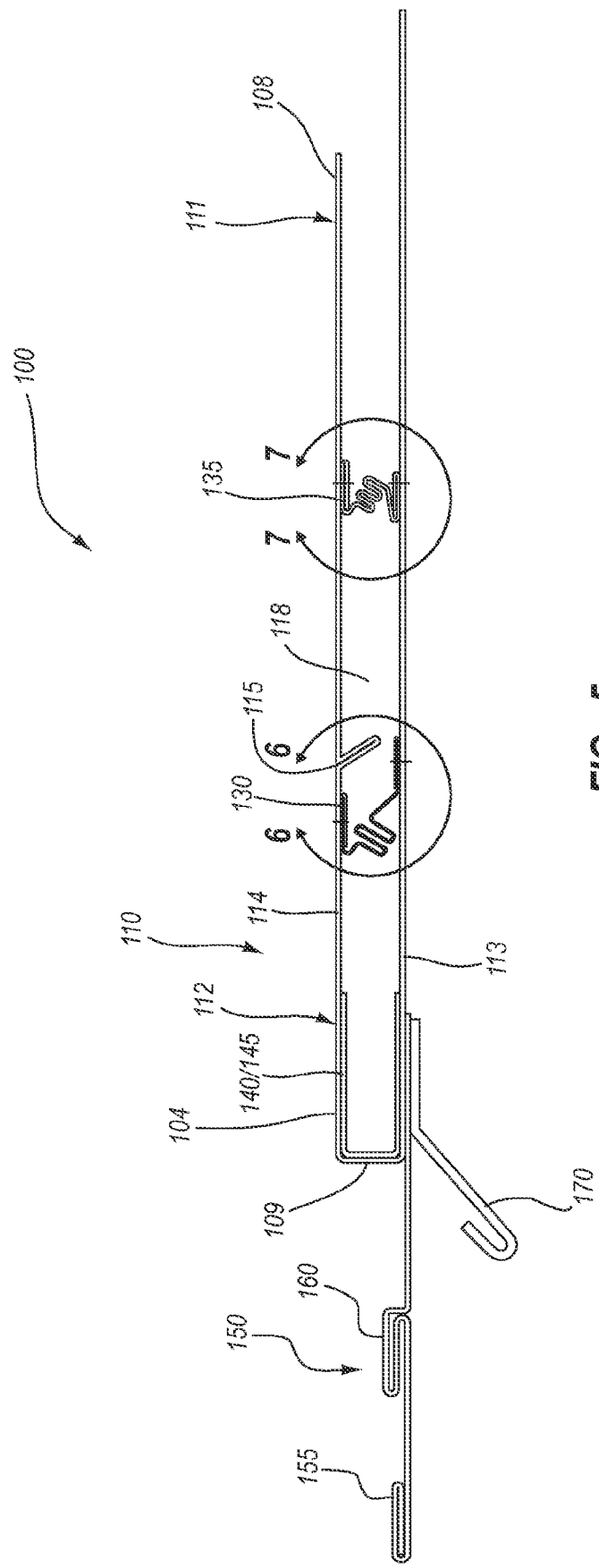
FIG. 5 is a side elevation view of the airbag assembly of FIG. 2.

FIG. 5 is a side elevation view of a portion of airbag assembly 100. As described herein, inflatable airbag cushion 110 comprises upper portion 111 and lower portion 112. Upper portion 111 comprises upper edge 108 that may be defined by the ends of front face 113 and rear face 114, or alternatively, the upper edge may be defined by a seam formed at the point at which the front face and the rear face are coupled. Lower portion 112 may comprise middle portion 104 at which fold 109 is formed, as well as one or more seam reinforcements 140, one or more heat panels 145, bag strap 150, and stabilizer strap 170.

First tether 130 and second tether 135 are each coupled to front face 113 and rear face 114 such that they are located within inflatable void 118. Forming pleat 115 in rear face 114 of the airbag cushion shortens the rear face, compared to the front face. As such, a top-most point 108 of rear face 114 is closer to bottom portion 112 of the airbag cushion, compared to a top-most point of front face 113. Bag strap 150 may comprise bag strap loop 160 and engagement portion 155. In the depicted embodiment, bag strap loop 160 comprises a fold or pleat of the bag strap material and engagement portion 155 comprises a roll or fold of the bag strap material. Stabilizer strap 170 may be coupled to cushion 110 at lower portion 112.

Figure 6:
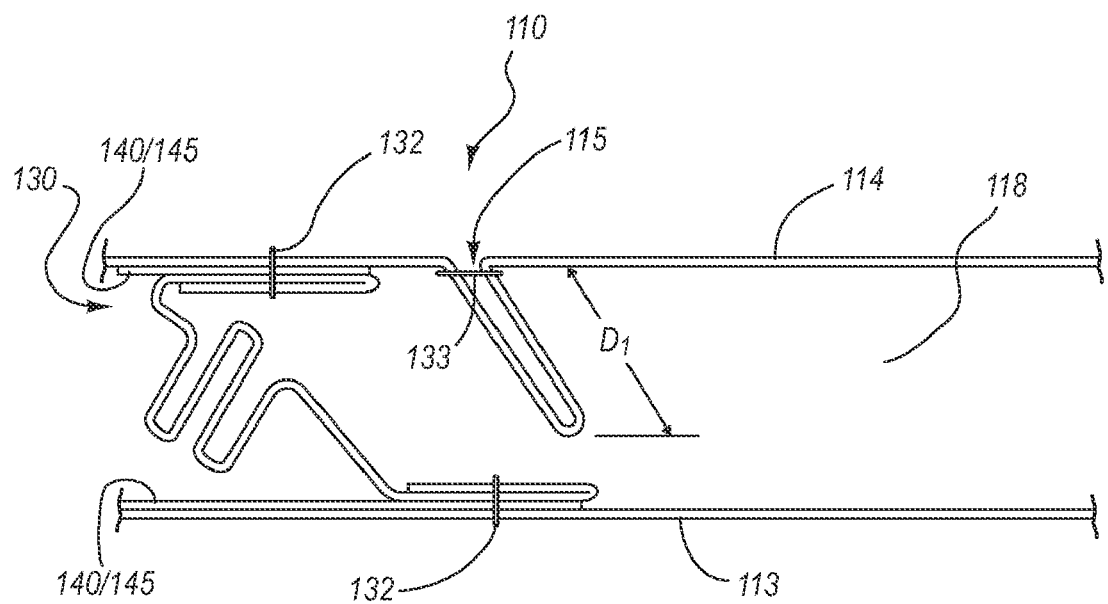
FIG. 6 is a close up side elevation view of a portion of the airbag assembly of FIG. 2.

FIG. 6 is a close up side elevation view of a portion of inflatable airbag cushion 110, wherein pleat 115 and first tether 130 are visible. Pleat 115 may be formed by drawing together two points on rear face 114, and then coupling the two points together via stitching 133. For clarity, the two points are neither touching each other or located directly adjacent each other, because seam reinforcement material may be used such that the pleat doesn't rupture during airbag deployment. Pleat 115 may project from rear face 114 into inflatable void 118 in the direction of front face 113. A distance $D_1$ to which the pleat may project from the front face may be between about 20 mm and about 50 mm. First tether 130 has a first and second end, each of which may be rolled or folded before being coupled to front face 113 and rear face 114 of cushion 110. First tether 130 may be asymmetrically coupled to the front and rear faces such that a tether attachment point on front face 113 may be located further from an inflator (not shown) or inflator attachment area (not shown) than the point at which the tether is attached to rear face 114. Reinforcement and/or heat panel 140/145 may extend to first tether attachment points such that each of the first tether attachment points comprise 4 or more layers of material. First tether 130 may be coupled to cushion 110 via stitching 132.

Figure 7:
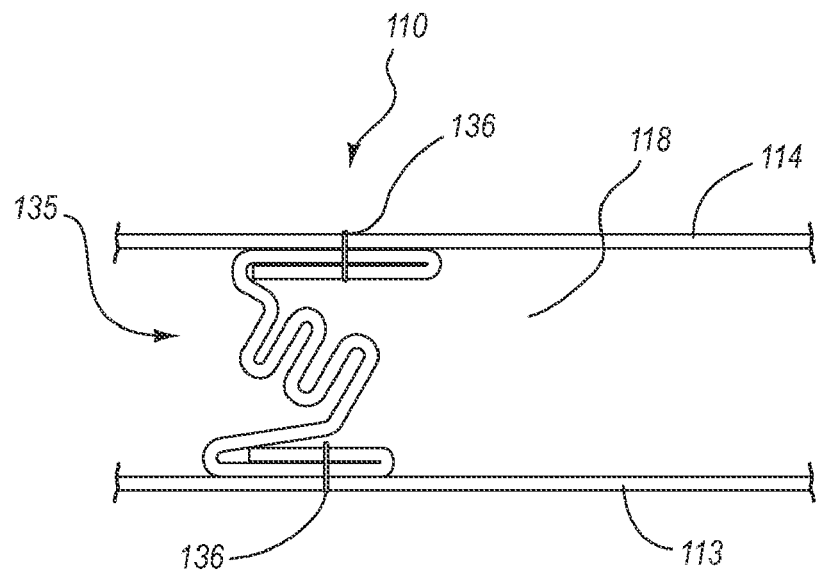
FIG. 7 is a close up side elevation view of a portion of the airbag assembly of FIG. 2.

FIG. 7 is a close up side elevation view of a portion of inflatable airbag cushion 110, wherein second tether 135 is visible within inflatable void 118. Second tether 135 may be coupled to cushion 110 at two attachment points, wherein one attachment point is located on front face 113 and the other attachment point is located on rear face 114. In the depiction of FIG. 7, the two attachment points for the two tethers may be located approximately equal distances from an inflator. In another embodiment, the second tether 135 attachment point on front face 113 may be located closer to the inflator (not shown) than the rear face 114 attachment point, as depicted for first tether 130 in FIG. 6. Second tether 135 may be coupled to cushion 110 via stitching 136, wherein the stitching crosses 3 layers of material at each attachment point.

Figure 8A:
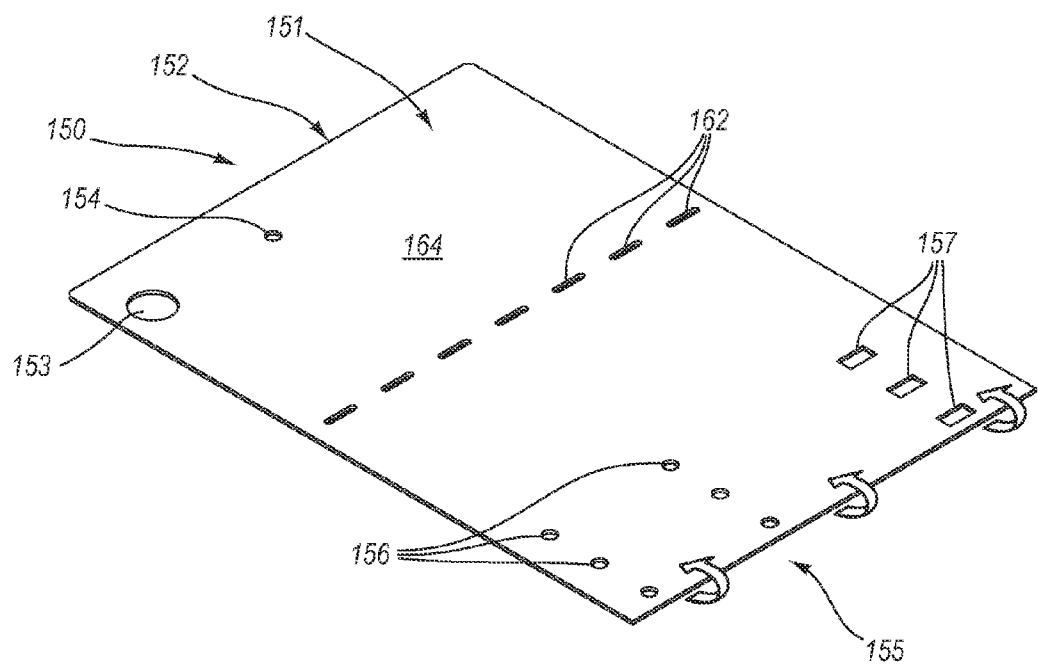
FIG. 8A is a perspective view of a panel of material from which a bag strap can be formed.
Figure 8B:
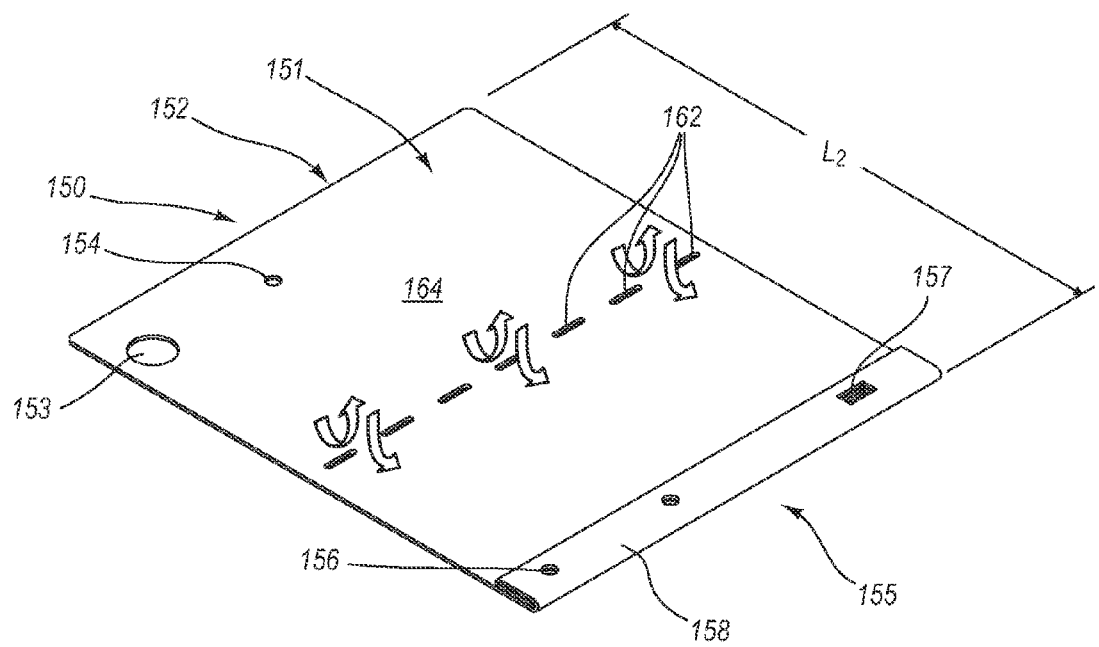
FIG. 8B is a perspective view of the panel of material of FIG. 8A after a portion of the panel has been folded.
Figure 8C:
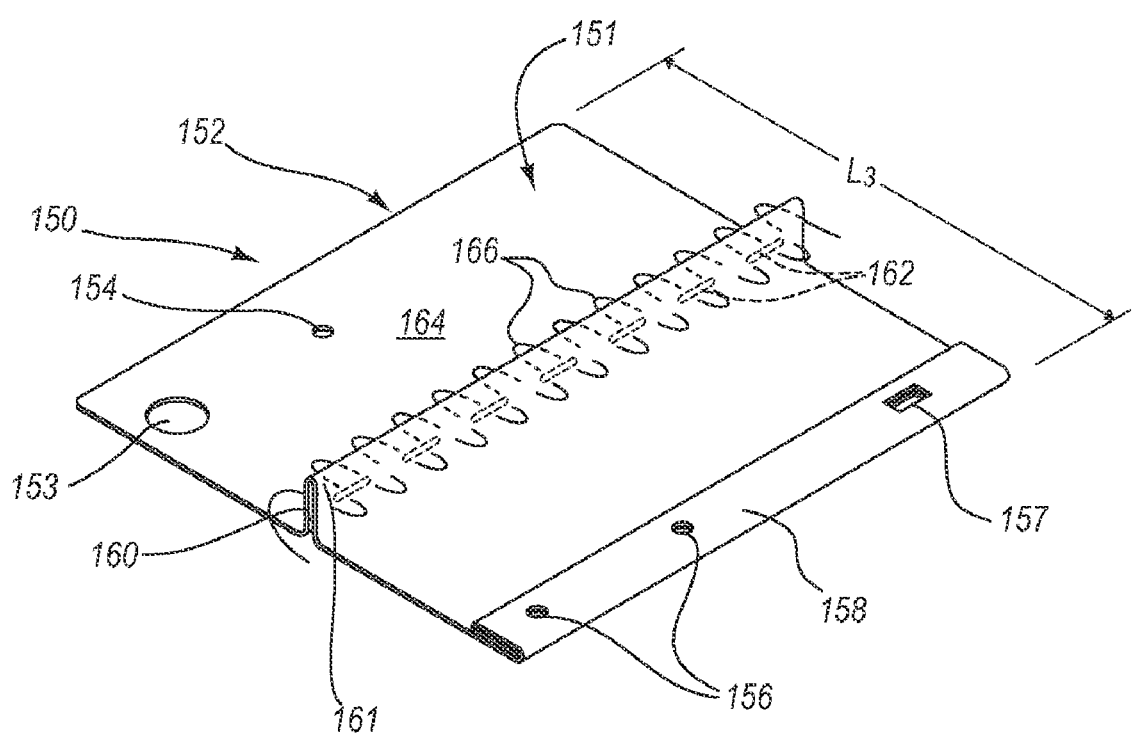
FIG. 8C is a perspective view of the panel of material of FIG. 8B after a loop has been formed in the panel of material.

FIGS. 8A-8C depict bag strap 150 from perspective views, wherein FIG. 8A depicts a full-length panel of material before it has been formed into a bag strap; FIG. 8B depicts the panel of material of FIG. 8A after a bottom portion of the bag strap has been rolled; and, FIG. 8C depicts the panel of material of FIG. 8B after the bag strap has had a loop formed in it. FIG. 8A depicts a panel of material 152 that has a predetermined length, and from which a bag strap may be formed. Panel 152 may comprise a piece of a woven nylon material similar to that which forms an inflatable airbag cushion. Panel 152 has a front face (not shown) and a rear face 164 and may comprise an airbag cushion portion 151, an inflator insert aperture 153, an inflator stem aperture 154, an engagement portion 155, engagement apertures 156, stabilizer strap apertures 157, and perforations 162. The apertures and perforations in panel 152 are formed in predetermined locations and may also be described as forming three horizontal rows of apertures and three vertical columns of apertures. The rows of apertures comprise apertures that have different functions, and the columns of apertures comprise apertures that have the same function.

FIG. 8B depicts panel 152 of FIG. 8A after engagement portion 155 has been rolled to form a rolled engagement portion 158. Rolled portion 158 is formed by folding a predetermined length of engagement portion 155 of panel 152 toward rear face 164 and in the direction of cushion portion 151. The distance of the fold is of such a magnitude that apertures 156 align with each other, and likewise, apertures 157 align with each other. After being folded, bag strap 150 has a shortened length, $L_2$. In another embodiment, the bag strap may not comprise a folded engagement portion. In such an embodiment, the panel of material from which the bag strap is formed may comprise two inflator stem apertures and one stabilizer strap aperture. FIG. 8B also depicts arrows that indicate the direction the panel of material may be folded to form a loop, which may be a step in a method for forming a bag strap.

FIG. 8C depicts panel 152 of FIG. 8B after a loop 160 has been formed such that the loop is located on rear face 164 and perforations 162 are incorporated within the loop. Loop 160 may also be described as a fold or a pleat in panel 152, from which bag strap 150 is formed. Loop 160 has an apex 161 that may also be described as a fold. Loop 160 may be retained via tear stitching 166 or any other suitable technique or structure. Tear stitching 166 is configured to rupture during inflatable airbag deployment. In one embodiment, the tear stitching includes, about 25 threads per 100 millimeters, although one skilled in the art will appreciate that other thread counts may similarly allow the rupture of tear stitching 166 during inflatable airbag deployment without damaging bag strap 150. Thus, tear stitching 166 is configured to rupture during deployment of the airbag cushion without damaging the bag strap and without retarding or altering cushion deployment.

In the depicted embodiment, tear stitch 166 runs across bag strap 150; however in other embodiments, the tear stitch may only be formed in a portion of the width of the bag strap or may define one or more light tack stitches. Tear stitch 166 and perforations 162 are configured to rupture during airbag cushion 110 deployment, such that the tear stitch ruptures before the perforations. Perforations 162 may be configured to allow bag strap 150 to become severed into two pieces during deployment. Perforations 162 are depicted as being located within bag strap loop 160; however, in alternative embodiments, the perforations may be located along different portions of the bag strap.

Panel 152 is of a predetermined length such that after the panel has been shortened by the formation of loop 160 and folded portion 158, the resulting bag strap is of a predetermined length $L_3$ that is shorter than the full length of the panel of material. The shortest length ($L_3$) of bag strap 150 can be called a wrapping length. The wrapping length is also shorter than a deployment length $L_2$ (depicted in FIG. 8B).

The wrapping length of the bag strap is configured to allow the bag strap to wrap around a rolled and/or folded inflatable airbag cushion and retain the cushion in this "packaged" or "folded" configuration. As discussed above, upon airbag deployment, the tear stitching that retains the bag strap in the wrapper length ruptures such that the bag strap adopts the deployment length. The deployment length of the bag strap is configured such that the airbag cushion can expand up to about 150 mm before it again begins to apply tension to the bag strap. As the airbag continues to expand, it is briefly retarded by the bag strap, until the perforations rupture and the airbag can continue to freely deploy.

Figure 9:
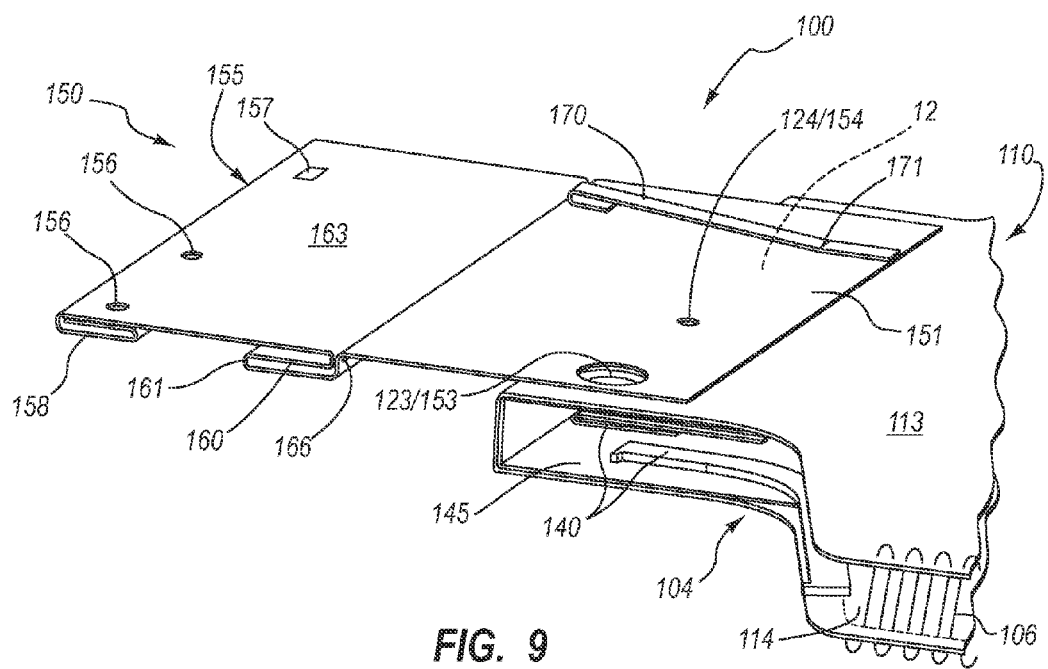
FIG. 9 is a close up top perspective view of a portion of the airbag assembly of FIG. 2.
Figure 10:
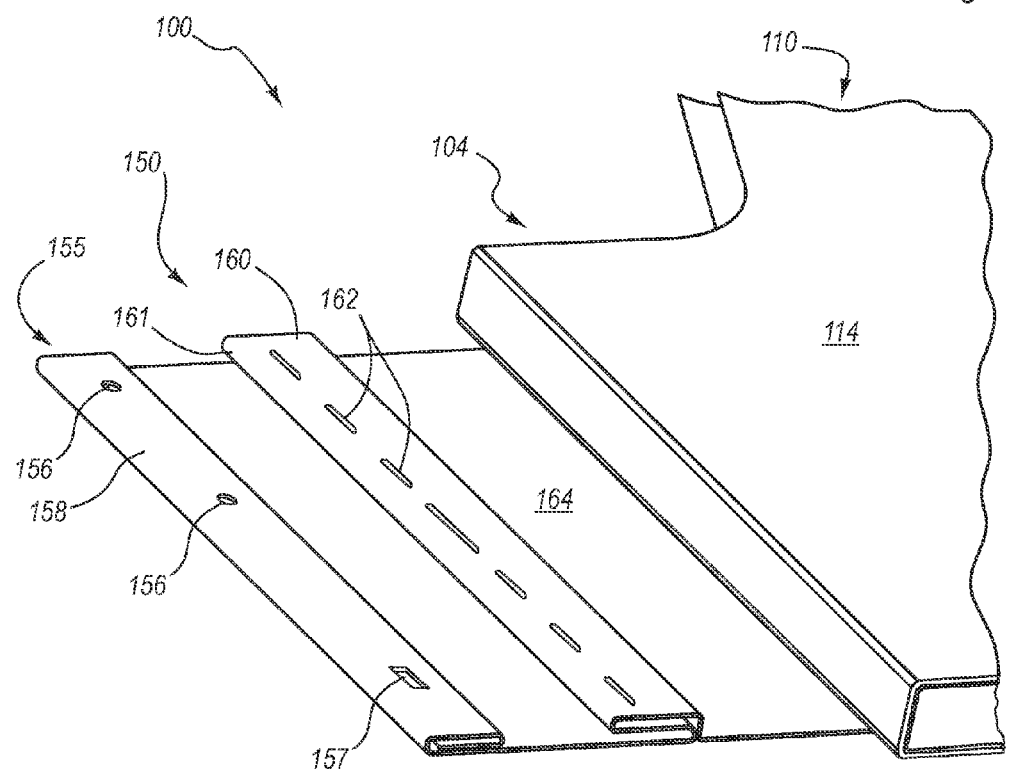
FIG. 10 is a close up bottom perspective view of a portion of the airbag assembly of FIG. 2.

FIGS. 9-10 are close up perspective views of a portion of airbag assembly 100, wherein FIG. 10 is rotated 180° compared to the view of FIG. 9. As depicted in the figures, stitching 106 may be employed to couple front and rear faces 113 and 114. Reinforcement and/or heat shield 140/145 can be seen as being coupled to cushion 110 near middle portion 104. Bag strap 150 is coupled to front face 113. Inflator aperture 153 of the bag strap is in alignment with inflator aperture 123 of cushion 110, and likewise, inflator stem aperture 154 is aligned with inflator stem aperture 124 of the cushion. Bag strap loop 160, tear stitch 166, and perforations 162 are located between cushion portion 151 of bag strap 150 wherein the bag strap is coupled to cushion 110 and an engagement portion 155 of bag strap 150. Loop 160 is configured such that it extends away from front face 163. In other words, an apex 161 of loop 160 extends from rear face 164 because the loop is formed on the rear face. Engagement portion 155 may comprise a folded engagement portion 158, inflator mounting stem engagement apertures 156, and stabilizer strap aperture 157.

Stabilizer strap 170 may comprise a piece of webbing that is about 10 mm wide and is coupled to bag strap 150 and cushion 110 on front face 113, near middle portion 104. Stabilizer strap 170 may be coupled to cushion 110 via stitching 171, such that the stitching is aligned with the centers of the inflator insert apertures 123/153 and inflator stem apertures 124/154. In the depicted embodiment, stitching 171 comprises a single line of stitching; however, in another embodiment, the stitching may comprise a box stitch. If a box stitch is employed, the portion of the box stitch that is closed to the inflator or attachment area 120 of cushion 110 may be aligned with the centers of inflator apertures 123/153 and 124/154.

Inflatable airbag cushion 110 may be configured into a packaged configuration by employing a method for folding an airbag cushion, wherein the method may comprise obtaining an airbag cushion membrane as disclosed herein, tucking the sides of the cushion in toward the center until a width of the cushion is less than a width of an airbag housing to which the cushion may be attached; applying an optional tack or tear stitch; reverse rolling or reverse folding the tucked top portion of the cushion one time; continuing to reverse roll or reverse fold the tucked top portion; wrapping a bag strap around the folded cushion; securing the bag strap to at least one inflator mounting stem. In one embodiment, the folding method results in an airbag cushion that has been rolled or folded up to 5 times.

FIGS. 11A-14 depict various views of airbag cushion assembly 100 during and after steps in a method for packaging an inflatable airbag cushion have been performed. FIGS. 11A-11C are front elevation views of assembly 100, wherein FIG. 11A depicts the assembly in a pre-packaging configuration, FIG. 11B depicts the assembly after a first step in the method for packing an airbag cushion has been performed, and FIG. 11C depicts the assembly after another step has been performed. In the views of FIGS. 11A-11C, various structures and features of assembly 100 are visible, including cushion 110, which has upper and lower portions 111 and 112, rear face 114, a first half 116, a second half 117, inflator insert aperture 123, and inflator mounting stem aperture 124; and bag strap 150, which has cushion portion 151, engagement portion 155, inflator mounting stem engagement apertures 156, stabilizer strap aperture 157, rolled portion 158, loop 160, perforations 162, and rear face 164.

In the depiction of FIG. 11A, assembly 110 is in a flattened configuration, wherein any wrinkles or folds in cushion 110 have been removed and rear faces 114 and 164 can be said to be facing "up". It can be said that providing an inflatable airbag cushion and flattening the cushion comprise first steps in a method for folding or packaging an inflatable airbag cushion.

FIG. 11B depicts cushion 110 after first and second halves 116 and 117 have been tucked in towards a midline of cushion 110. The tucks may be performed by pushing each half of the cushion into the cushion, "outside-in". In other words, first and second halves of the airbag cushion are each tucked into a middle portion of the airbag cushion such that the front and rear faces of each of the first and second halves are positioned in between the upper and lower panels of the middle portion. After the tucking steps have been performed, cushion 110 comprises a tucked upper portion 119.

FIG. 11C depicts cushion 110 after a tucked upper portion 119 of cushion 100 is folded one time in the direction of rear face 114, away from front face 113. As such, tucked upper portion 119 is folded downward toward lower portion 112 and bag strap 150.

Figure 12A:
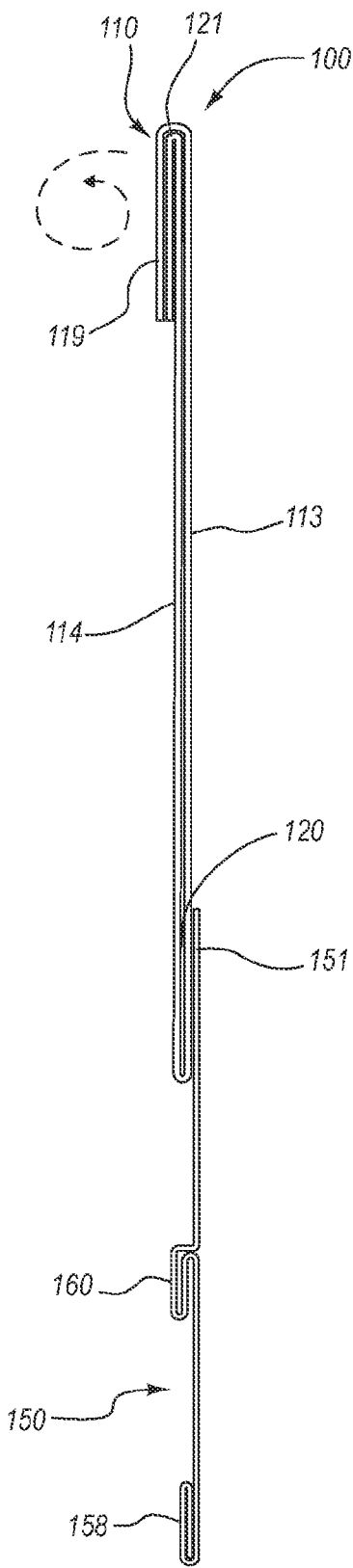
FIG. 12A is a side elevation view of the airbag cushion assembly of FIG. 11C.

FIGS. 12A-12D depict airbag assembly 100 from a side elevation view, wherein the assembly is being subjected to steps in a method for packaging an inflatable airbag cushion. Visible in the figures are cushion 110, which has front face 113, rear face 114, attachment area 120, and bag strap 150, which has cushion portion 151, folded engagement portion 158, and loop 160. FIG. 12A is a side elevation view that depicts assembly 100, wherein the assembly is at the same stage of packaging as depicted in FIG. 11C. Upper tucked portion 119 has been folded one time toward rear face 114, in the direction of bag strap 150, such that a fold 121 has been formed.

Figure 12B:
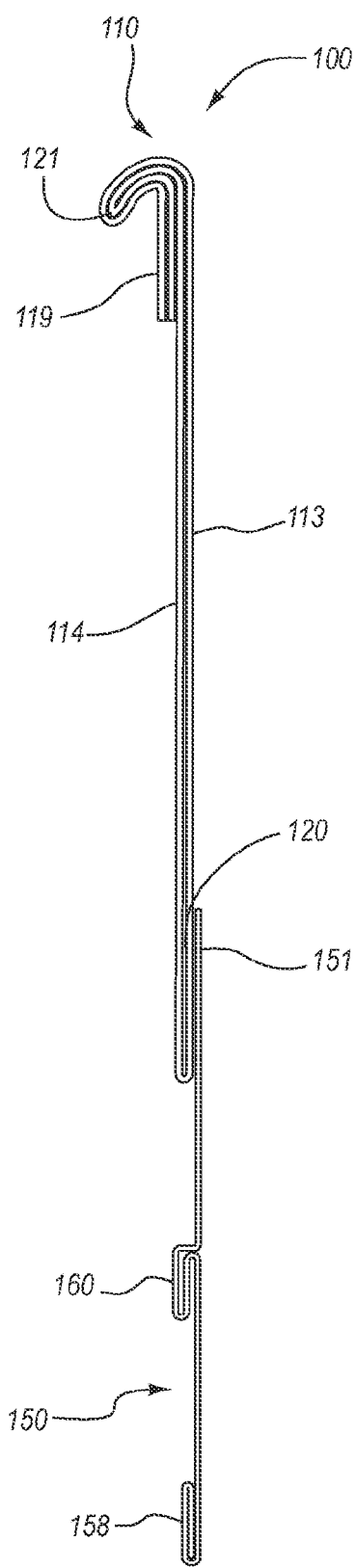
FIG. 12B is a side elevation view of the airbag cushion assembly of FIG. 12A after a top portion of the airbag cushion has begun to be rolled in accordance with a method for folding an airbag cushion.

FIG. 12B depicts the airbag assembly 100 of FIG. 12A after fold 121 of upper tucked portion 119 has begun to be rolled in the direction of rear face 114. Since the roll is made in the direction of the rear face, it may be described as being a "reverse" roll. In another embodiment, the airbag cushion may be folded, instead of rolled. However, it will be noted that as consecutive folds are made, they may begin to resemble rolls.

Figure 12C:
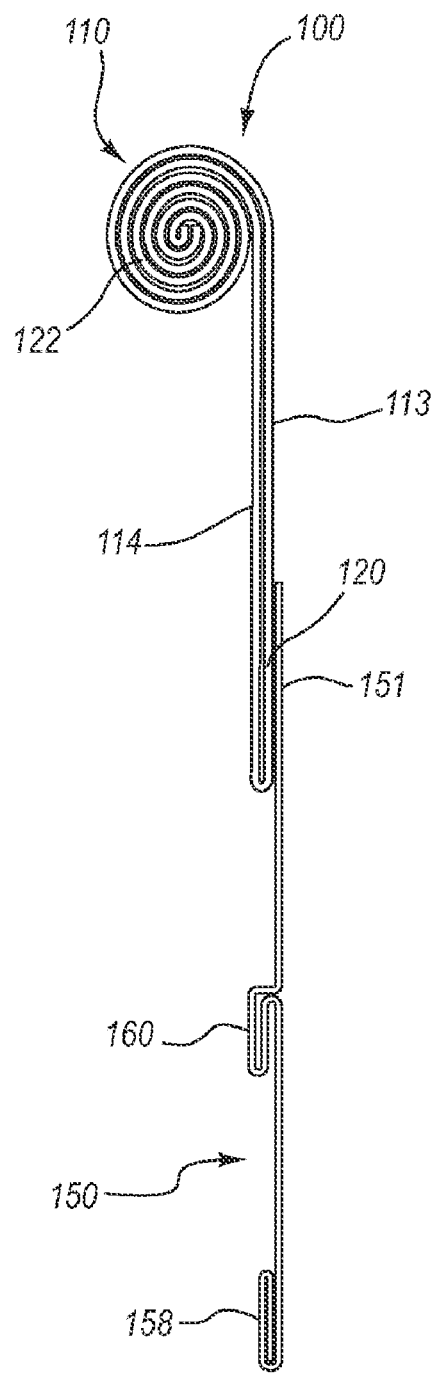
FIG. 12C is a side elevation view of the airbag cushion assembly of FIG. 12B, wherein the airbag cushion has continued to be rolled in accordance with a method for folding an airbag cushion.
Figure 12D:
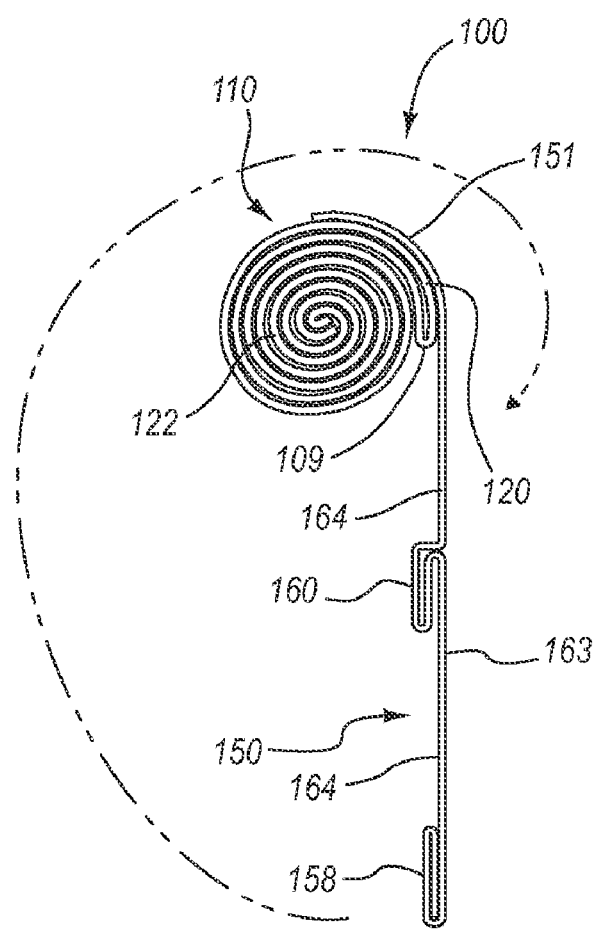
FIG. 12D is a side elevation view of the airbag cushion assembly of FIG. 12C after the top portion of the airbag cushion has been rolled in accordance with a method for folding an airbag cushion.

FIGS. 12C-12D depict the airbag assembly 100 of FIG. 12B after the folded portion of the upper tucked portion of the airbag cushion has continued to be rolled towards rear face 114 in the direction of bag strap 150. As cushion 110 is rolled, the cushion comprises a rolled inflatable airbag cushion 122. As noted previously, attachment area 120 is located on front face 113 of cushion 110, and bag strap 150 is coupled to the cushion at cushion portion 151 of the bag strap. Cushion 110 may continue to be rolled in the direction of bag strap 150 until rolled cushion 122 is rolled to fold 109 of the cushion. As such, cushion portion 151 of bag strap 150 may be partially rolled with the cushion. A next step in the packaging method disclosed herein may comprise wrapping bag strap 150 around cushion 110 such that rear face 164 of the bag strap is on the inside of the wrap and front face 163 is on the outside of the packaged airbag assembly.

Figures 13A, 13B:
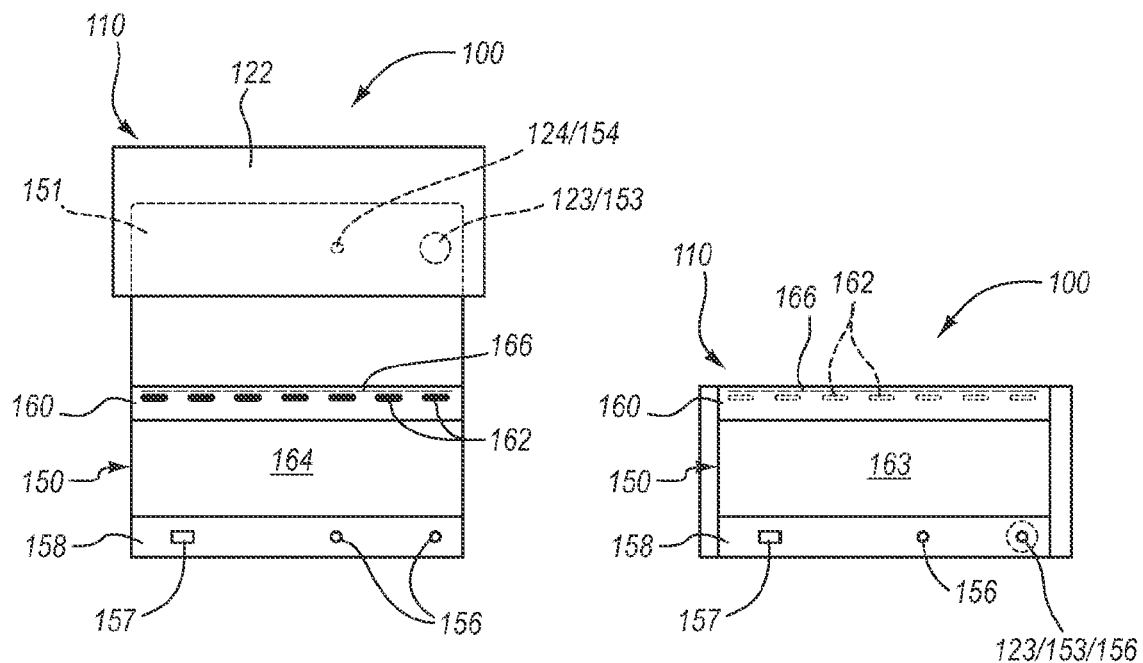
FIG. 13A is a rear elevation view of the airbag assembly of FIG. 12D.
FIG. 13B is a rear elevation view of the airbag assembly of FIG. 13A after a bag strap has been wrapped around the cushion in accordance with a method for folding an airbag cushion.

FIGS. 13A-13B depict airbag cushion assembly 100 from front elevation views. Visible in the figures are cushion 110, and bag strap 150 that has cushion portion 151, inflator insert aperture 153, inflator stem aperture 154, inflator engagement apertures 156, strap aperture 157, folded engagement portion 158, loop 160, perforations 162, front face 163, rear face 164, and tear stitching 166.

In the depiction of FIG. 13A the assembly is at the same stage of packaging as depicted in FIG. 12D. Cushion 110 has been rolled such that it comprises a rolled cushion 122 and rear face 164 of bag strap 150 is positioned such that it can be wrapped around the rolled airbag cushion. As noted herein, inflator insert aperture 153 is aligned with cushion 110 inflator insert aperture 123 and inflator mounting stem aperture 154 is aligned with inflator mounting stem aperture 124.

FIG. 13B depicts a next step in the method for packaging the airbag cushion, which may comprise wrapping bag strap 150 around rolled cushion 122 such that inflator stem engagement apertures 156 are aligned with inflator insert apertures 123/153 and inflator mounting stem apertures 124/154. Since the rear face of bag strap 150 is on the inside of the packaged airbag cushion, front face 163 is visible. If an optional stabilizer strap is present, it may protrude through strap aperture 157. Prior to completing rolling cushion 110, an inflator may be inserted in cushion 110 such that the inflator mounting stems protrude through apertures 123/153, and apertures 156, which are located in the folded engagement portion 158 of bag strap 150. The length of bag strap 150 is configured such that loop 160 is located at a predetermined position on rolled cushion 122. Since loop 160 is located at a predetermined location, perforations 162 and tear stitching 166 are also located at predetermined locations on rolled cushion 122.

Figure 14:
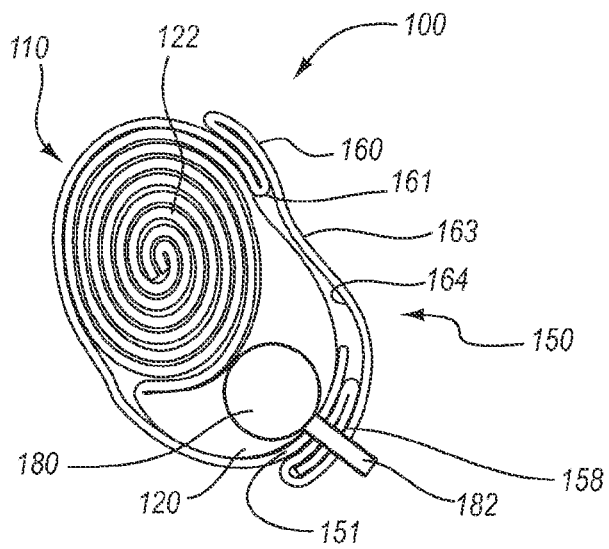
FIG. 14 is a side elevation view of the airbag assembly of FIG. 13B.

FIG. 14 depicts a portion of airbag assembly 100 from a side elevation view after cushion 110 has been placed in a rolled configuration 122, the rolled cushion has been wrapped by bag strap 150, and an inflator 180 has been inserted into the cushion. Attachment area 120 of cushion 110 is the area to which inflator 180 can be attached as well as the area to which cushion portion 151 of the bag strap is coupled. In the packaged configuration, folded engagement portion 158 is adjacent to cushion portion 151, rear face 164 is adjacent to the wrapped cushion 122, and front face 163 is located on the outside of the packaged airbag assembly. First inflator mounting stem 182 and second Inflator mounting stem (not visible) may protrude through cushion 110 attachment area 120, bag strap 150 cushion portion 151, and folded engagement portion 158. Bag strap loop 160 is located at a predetermined location on cushion 110, and the loop is oriented such that the apex 161 of the loop is between the bag strap and the cushion.

Figure 15:
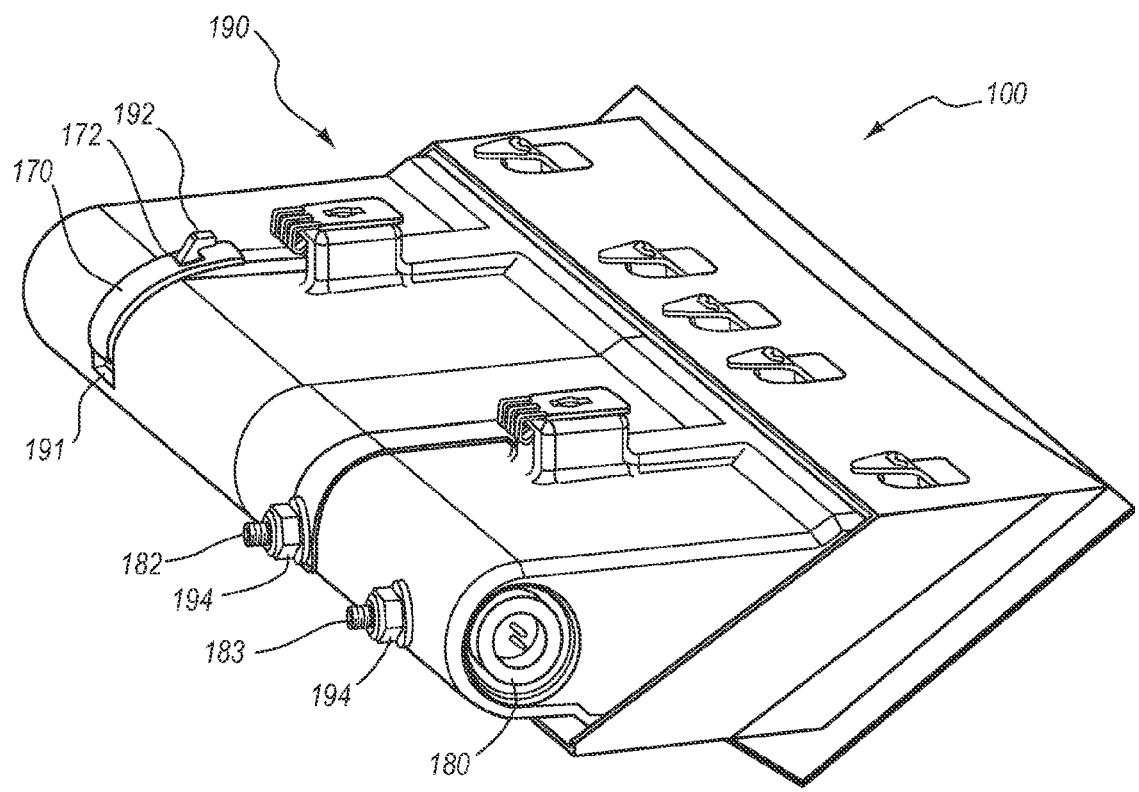
FIG. 15 is a rear perspective view of an airbag housing into which a packaged airbag assembly of FIG. 2 has been placed.

FIG. 15 is a perspective view of airbag assembly 100 after the airbag cushion has been folded and/or rolled into a folded configuration, wrapped by the bag strap, and placed into an airbag housing 190. Housing 190 may comprise a metal or plastic container to which the inflatable airbag cushion may be fixedly attached. Housing 190 is configured to be mounted within a vehicle and serves to specifically position airbag assembly 100 so that the inflatable cushion may deploy with predetermined characteristics. Housing 190 is configured to fluidly couple inflator 180 with the inflatable void of the inflatable airbag cushion, as well as fixedly couple the airbag cushion to a vehicle structure. Housing 190 may comprise a stabilizer strap aperture 191, through which stabilizer strap 170 protrudes. A mounting aperture 172 formed in stabilizer strap 170 may be received by a mounting component 192 on housing 190. In the depicted embodiment, mounting component 192 comprises a mounting hook; however in other embodiments, the mounting component may comprise a tab, an aperture for receiving hardware, or a linear extension. Housing 190 may further comprise a plurality of apertures (not visible) through which first and second inflator mounting stems 182 and 183 can protrude. First and second inflator mounting stems 182 and 183 may receive mounting hardware 194, such that the inflator, bag strap, and cushion may be fixedly coupled to the housing.

Inflator 180 is configured to be activated in response to predetermined vehicle conditions as determined by vehicle sensors. Upon activation, the inflator rapidly generates or releases inflation gas, which forces the airbag cushion through a cosmetic cover and rapidly inflates the cushion. The inflator may be one of several types, such as pyrotechnic, stored gas, or a combination inflator. Additionally, the inflator may comprise a single or multistage inflator. As will be appreciated by those skilled in the art, one or more vehicle sensors of a variety of types and configurations can be utilized to configure a set of predetermined conditions that will dictate whether the inflator is activated. For example, in one embodiment, a seat rail sensor is utilized to detect how close or far away from an airbag deployment surface an occupant's seat is positioned. In another embodiment, a seat scale may be used to determine whether an occupant is occupying the seat and if so, ascertain an approximate weight of the occupant. In yet another embodiment an optical or infrared sensor may be used to determine an occupant's approximate surface area and/or distance from an airbag deployment surface. In another embodiment, an accelerometer is employed to measure the magnitude of negative acceleration experienced by a vehicle, which may indicate whether an accident has occurred and the severity of the accident. Additionally, a combination of these and other suitable sensor types may be used.

FIGS. 16-20 are various views of portions of another embodiment of an inflatable cushion airbag assembly 200, wherein the figures depict structures used in a method for coupling an inflator to an airbag cushion membrane and airbag housing. The figures also depict a stabilizer strap that aids the cushion in achieving predetermined deployment characteristics. Inflatable cushion airbag assembly 200 may be configured similarly and may function similarly as inflatable cushion airbag assembly 100, described herein. Assembly 200 may comprise an inflatable cushion membrane, a stabilizer strap, an inflator, and an airbag housing.

Figure 16:
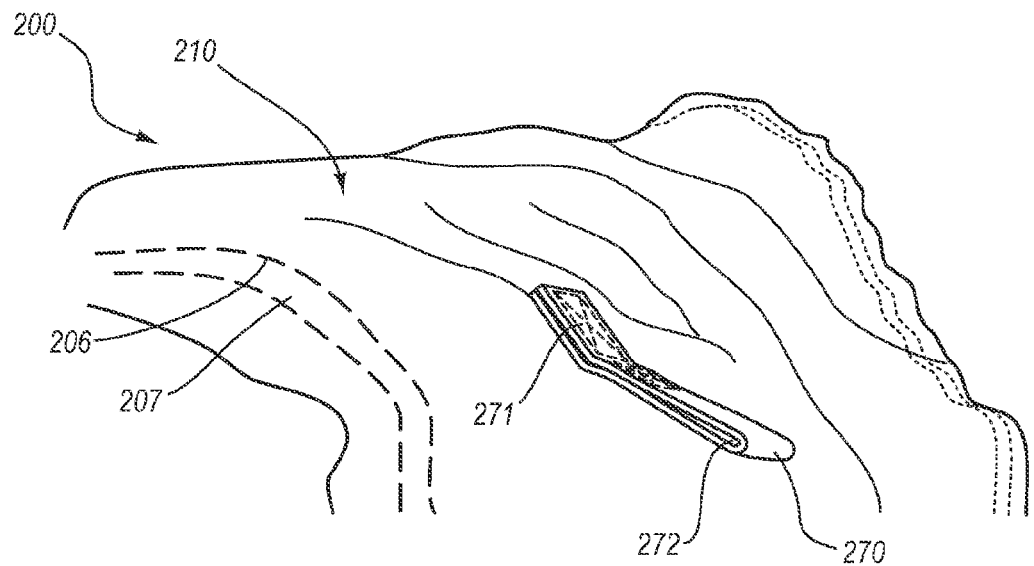
FIG. 16 is a close up cutaway perspective view of a portion of another embodiment of an inflatable cushion airbag assembly.

FIG. 16 is a close up cutaway perspective view of a portion of inflatable cushion airbag assembly 200. Inflatable cushion membrane 210 may be configured like cushion membrane 110, described herein, or cushion 210 may be configured differently. Cushion 210 defines and inflatable void that is formed by a seam 207 that comprises stitching 206. Cushion 210 may comprise a stabilizer strap 270 that is formed by a loop of nylon webbing that defines a mounting aperture 272. Strap 270 may be about 10 mm wide and has a predetermined length. Stitching 271 may be employed to couple strap 270 to cushion 210.

Figure 17:
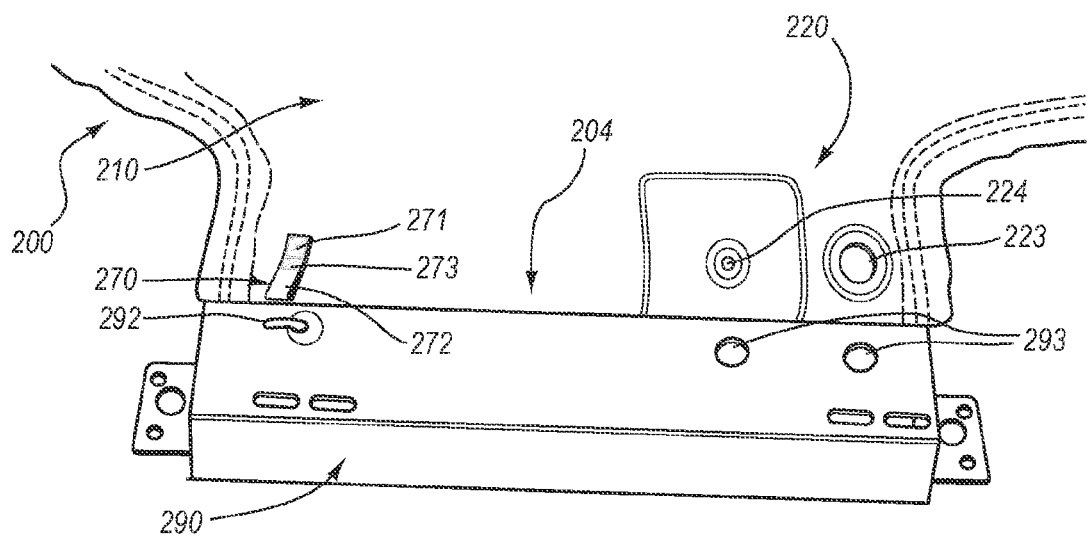
FIG. 17 is a top perspective of a portion of the airbag assembly of FIG. 16.

FIG. 17 is a top perspective view of airbag assembly 200, wherein airbag cushion 210 is located adjacent to housing 290 prior to the cushion being coupled to the housing. Cushion 210 comprises a folded middle portion 204, an inflator attachment area, an inflator insert aperture 223, and an inflator stem aperture 224. Strap 270 may be positioned on cushion 210 such that a lowest portion 273 of stitching 271 is aligned with the centers of apertures 223 and 224. Mounting aperture 272 of strap 270 is configured to be received by a strap hook 292 located on housing 290. Housing 290 also comprises apertures 293 that are configured to receive inflator mounting stems.

Figure 18:
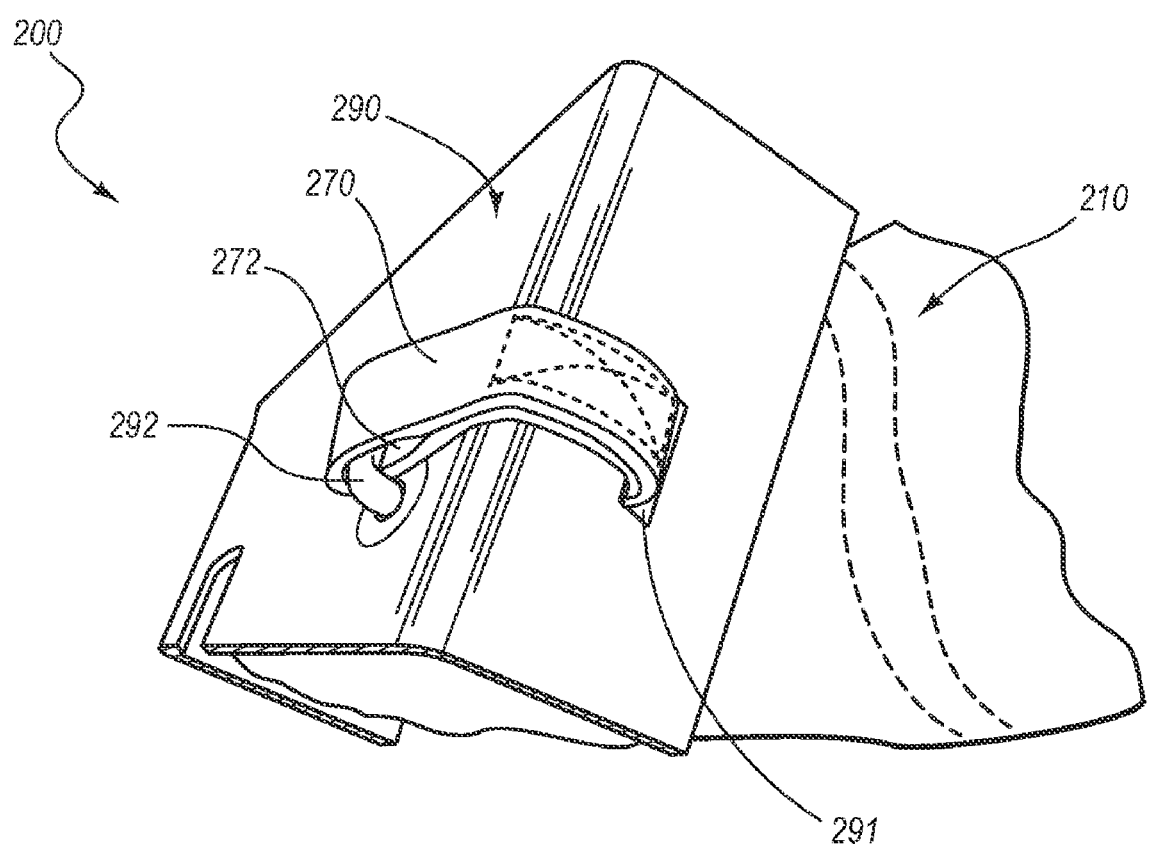
FIG. 18 is a close up cutaway perspective view of a portion of the inflatable cushion airbag assembly of FIG. 17 after another step in a method for attaching an inflator has been performed.

FIG. 18 is a close up cutaway perspective view of assembly 200, wherein cushion 210 and housing 290 have been rotated such that a strap aperture 291 is visible. Stabilizer strap 270 protrudes through strap aperture 291 and extends to strap hook 292. Strap mounting aperture 272 is configured to fit over and be retained by strap hook 292.

Figure 19A:
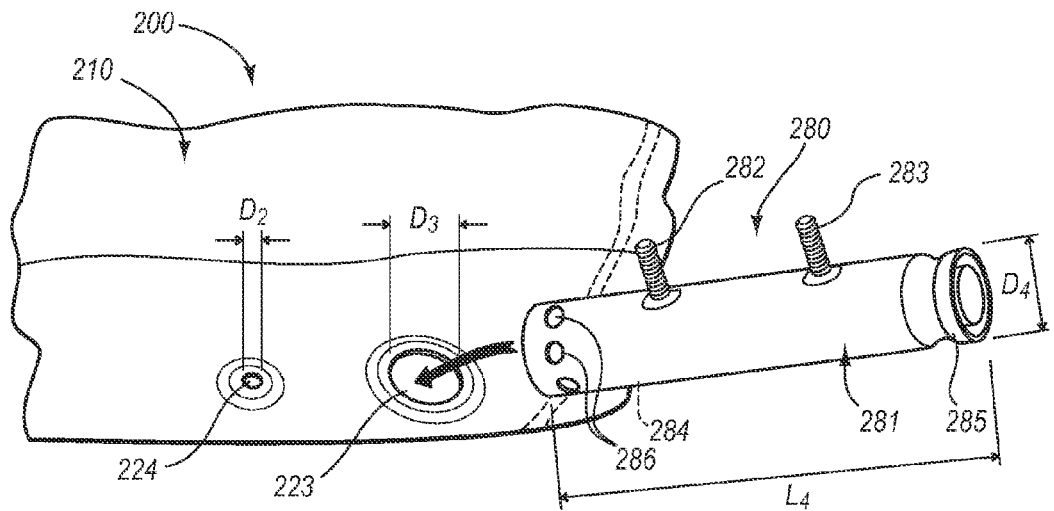
FIG. 19A is a close up cutaway perspective view of a portion of another embodiment of an inflatable cushion airbag assembly.
Figure 19B:
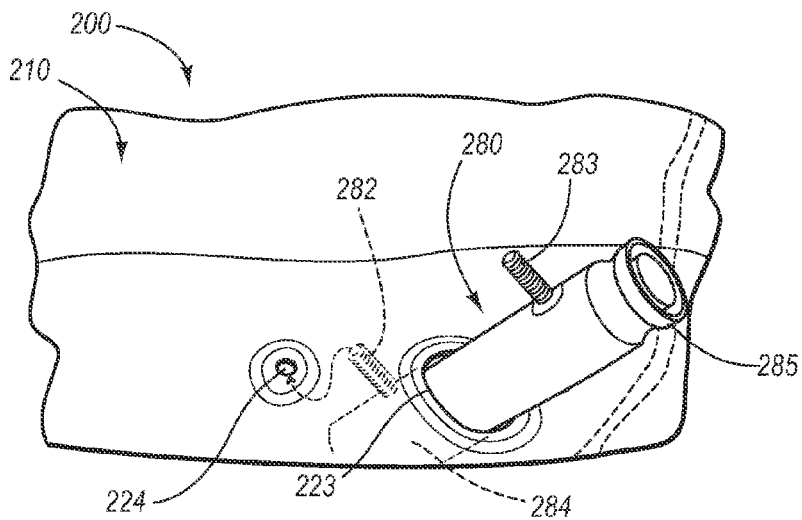
FIG. 19B is a close up cutaway perspective view of the inflatable cushion airbag assembly of FIG. 19A after a step in a method for attaching an inflator has been performed.
Figure 19C:
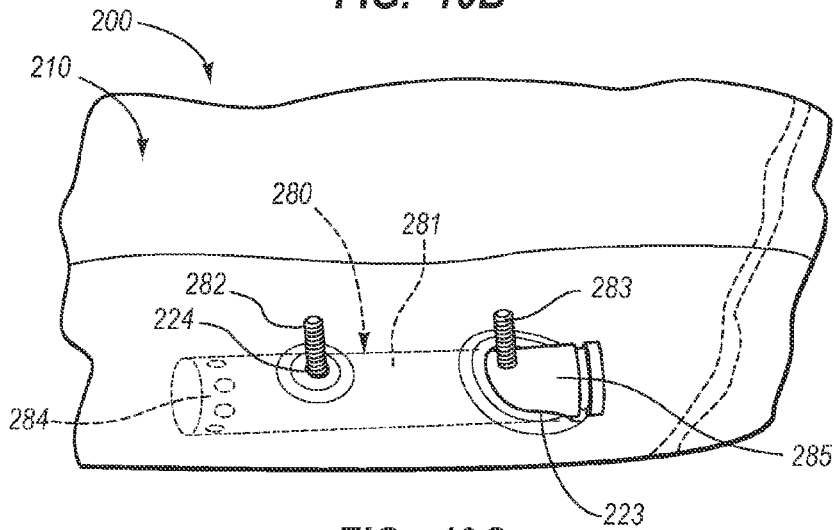
FIG. 19C is a close up cutaway perspective view of the inflatable cushion airbag assembly of FIG. 19B after another step in a method for attaching an inflator has been performed.
Figure 20:
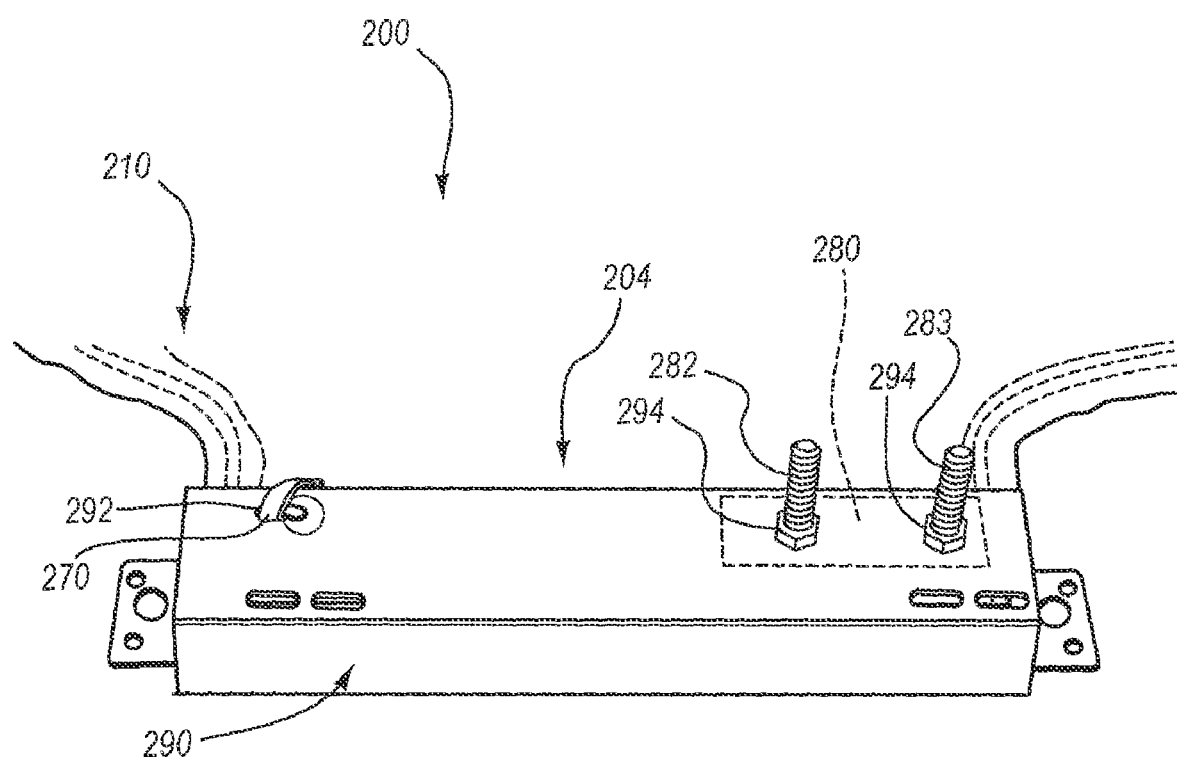
FIG. 20 is a close up cutaway front perspective view of the inflatable cushion airbag assembly of FIG. 19A

FIGS. 19A-20 are perspective views of a portion of inflatable cushion airbag assembly 200, wherein the figures depict a method and structures for coupling an inflator to an airbag cushion membrane and airbag housing. Inflator 280, cushion 210, and housing 290 are configured such that they may be employed in a method for coupling an airbag cushion to an airbag housing.

FIG. 19A is a close up cutaway perspective view of a portion inflatable cushion airbag assembly 200, which depicts a first step in the method, wherein the step may comprise inserting first end 284 of inflator 280. Also, first inflator stem 282 is inserted into inflator insert aperture 223 of cushion 210. Cushion 210 comprises inflator insert aperture 223 and inflator stem aperture 224, which have diameters $D_3$ and $D_2$, respectively, which are of predetermined magnitudes. Diameter $D_2$ of inflator mounting stem aperture 224 is configured such that it can receive a mounting stem from an inflator. As such the diameter of the mounting stem aperture may be about equal to, or slightly larger than the diameter of the mounting stem. Diameter $D_3$ of aperture 223 is configured such that the aperture can accommodate the diameter $D_4$ of inflator 280. As such, $D_3$ of aperture 223 may be greater than the diameter $D_4$ of inflator 280, or the diameters may be of about equal magnitude. In some embodiments, the magnitude of $D_2$ may be from about 4.0 mm to about 8.0 mm. In one embodiment, $D_2$ has a magnitude of about 6.5 mm. In some embodiments, the magnitude of $D_3$ may be from about 20 mm to about 30 mm. In one embodiment, $D_3$ has a magnitude of about 25 mm. The inflator insert aperture and/or the inflator mounting stem aperture may be strengthened and/or reinforced by stitching or additional material. In some embodiments, the magnitude of inflator diameter $D_4$ may be from about 20 mm to about 30 mm. In one embodiment, $D_4$ has a magnitude of about 25 mm.

Inflator 280 may comprises a pyrotechnic inflator with a tubular body 281, from which first and second mounting stems 282 and 283 protrude perpendicularly from the inflator body. The inflator is defined by a first end 284 and a second end 285, wherein the first end may have one or more vents 286 through which inflation gas can be expelled. Inflator 280 comprises a predetermined length $L_4$. In some embodiments, the magnitude of inflator length $L_4$ may be from about 100 mm to about 120 mm. In one embodiment, $L_4$ has a magnitude of about 108 mm. A distance between mounting stems may be from about 70 mm to about 90 mm. In one embodiment, the distance between mounting stems is about 80 mm. As such, the distance between the inflator insert aperture and the inflator mounting stem aperture may be from about 100 mm to about 120 mm, and in one embodiment, the distance is about 80 mm.

FIG. 19B is a close up cutaway perspective view of the inflatable cushion airbag assembly of FIG. 94A after first end 284 and first mounting stem 282 of the inflator has been inserted into the inflator insert aperture. The method may further comprise pushing inflator 280 toward inflator stem aperture 224 of cushion 210. Inflator 280 may continue to be pushed in the direction of inflator stem aperture 224 until first inflator stem 282 is approximately aligned with aperture 224, but second end 285 has not been pushed through inflator insert aperture 223.

FIG. 19C is a close up cutaway perspective view of the inflatable cushion airbag assembly 200 of FIG. 19B. A method for coupling an airbag cushion to an airbag housing via an inflator may further comprise threading first mounting stem 282 through inflator stem aperture 224. When inflator 280 is positioned properly, first end 284 is located within cushion 210, inflator stem 282 protrudes through aperture 224, and second inflator stem 283 and second end 285 protrude through aperture 223. Stem 283 may abut cushion 210 at a rim of aperture 223. The diameters of first inflator stem 282 and inflator stud aperture 224 may be configured such that during deployment, the junction between the stem and the aperture is substantially airtight. Likewise, the diameters of inflator body 281 and inflator insert aperture 223 may be configured such that during deployment, the junction between the inflator and the aperture is substantially airtight.

FIG. 20 is a close up cutaway perspective view of the inflatable cushion airbag assembly 200 after another step in a method for attaching an inflator has been performed. The method may further comprise threading first and second inflator stems 282 and 283 of inflator 280 through corresponding housing mounting apertures 293. Cushion 210 may then be fixedly attached to housing 290 by employing mounting hardware that matingly engages first and second inflator stems 282 and 283, such as bolts 290. The previous methods may be said to be methods for attaching an inflator or methods for attaching an airbag cushion to an airbag housing.

FIG. 20 also depicts stabilizer strap 270 after the strap has been threaded through the strap aperture (not shown) and has been received by strap hook 292. Stabilizer strap 270 may or may not be used in combination with the structures associated with the methods for coupling an airbag cushion to a housing via an inflator, as described above. Stabilizer strap 270 may be used in combination with cushion 210 and inflator 280, so that during inflatable airbag cushion deployment, the cushion can not rotate around the inflator and cushion attachment points. As such, the stabilizer strap prohibits the airbag cushion from skewing during deployment.

One skilled in the art will appreciate that a variety of inflators and airbag housings may be used without deviating from the sprit of the present disclosure. For example, the size and shape of the inflators may differ from those described herein. Further, the inflator mounting stems may not be integral to the inflator, but rather, in some embodiments, an inflator housing may be employed that provides the mounting stems. Additionally, the inflator and/or housing may comprise less than or more than two mounting stems and those mounting stems may be oriented axially to the inflator body, rather than perpendicularly as described herein. Airbag housing 290 may not comprise a complete housing, but rather may define a mounting structure that may or may not be a subcomponent of an airbag housing.

The present disclosure is related to two U.S. patent applications entitled, "INFLATABLE KNEE AIRBAGS AND INTERNAL TETHERS PRODUCED FROM SINGLE PANELS OF MATERIAL," and, "INFLATABLE KNEE AIRBAG ASSEMBLIES WITH BAG STRAPS FOR WRAPPING THE AIRBAGS AND OPTIMIZING DEPLOYMENT," which were filed on the same day as the present disclosure and are hereby incorporated by reference.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the disclosure is therefore defined by the following claims.

The invention claimed is:

1. An airbag assembly, comprising:
an inflator having at least one mounting stem that projects perpendicularly away from a long axis of a body portion of the inflator,
wherein the inflator has a longitudinal axis;
an airbag housing coupled to the inflator,
wherein the airbag housing has a longitudinal axis extending between a first end and a second end, wherein the longitudinal axes of the inflator and the airbag housing are either collinear or parallel,
wherein the airbag housing comprises at least one aperture at the first end,
wherein the at least one inflator mounting stem extends through the at least one aperture,
wherein the airbag housing comprises a mounting component located at the second end of the airbag housing;
an inflatable airbag cushion comprising an inflator attachment portion, which comprises an inflator mounting stem aperture through which the at least one inflator mounting stem extends to couple the cushion to one end of the inflator and one end of the housing; and,
a stabilizer strap coupled to the airbag cushion, wherein the stabilizer strap extends to and is coupled to the mounting component of the airbag housing,
wherein upon inflatable airbag cushion deployment in a direction that is perpendicular with respect to the longitudinal axes of the inflator and the airbag housing, the stabilizer strap comes under tension and stabilizes the airbag cushion during deployment.

2. The airbag cushion of claim 1, wherein the stabilizer strap prohibits the airbag cushion from rotating around the inflator attachment area, relative to the longitudinal axis of the airbag housing, during inflatable airbag cushion deployment.

3. The airbag assembly of claim 1, wherein the inflator attachment area is configured such that it is seamless.

4. The airbag assembly of claim 1, wherein the airbag cushion and the inflator are configured such that the inflator can be inserted into the airbag cushion after the airbag cushion has been placed in a folded configuration.

5. The airbag assembly of claim 1, wherein the assembly further comprises a bag strap coupled to the inflatable airbag cushion, and wherein the bag strap comprises at least one inflator mounting aperture.

6. The airbag assembly of claim 5, wherein the bag strap is configured such that it can be wrapped around and retain a folded inflatable airbag cushion in the folded configuration, such that the airbag cushion comprises a packaged configuration.

7. The airbag assembly of claim 6, wherein the inflator is configured such that it may be inserted into the airbag cushion after the airbag cushion has been placed in the packaged configuration.

8. An inflatable airbag cushion assembly, comprising:
an inflator having at least one mounting stem that projects perpendicularly away from a long axis of a body portion of the inflator,
wherein the inflator has a longitudinal axis;
an airbag housing coupled to the inflator,
wherein the airbag housing has a longitudinal axis extending between a first end and a second end,
wherein the longitudinal axes of the inflator and the airbag housing are either collinear or parallel,
wherein the airbag housing comprises at least one aperture at the first end,
wherein the at least one inflator mounting stem extends through the at least one aperture,
wherein the airbag housing comprises a mounting component located at the second end of the airbag housing;
an inflatable airbag cushion coupled to the airbag housing via the inflator, wherein the cushion comprises an inflator mounting portion that has an inflator insert aperture and an inflator mounting stem aperture; and,
a stabilizer strap coupled to the airbag cushion, wherein the stabilizer strap extends to and is coupled to the mounting component of the airbag housing,
wherein upon inflatable airbag cushion deployment in a direction that is perpendicular with respect to the longitudinal axes of the inflator and the airbag housing, the stabilizer strap comes under tension and stabilizes the airbag cushion during deployment.

9. The inflatable airbag cushion assembly of claim 8, wherein the inflatable airbag cushion comprises a knee airbag cushion.

10. The inflatable airbag cushion assembly of claim 8, wherein the airbag housing further comprises an aperture for receiving the stabilizer strap and wherein the stabilizer strap extends through the aperture for receiving the stabilizer strap to the mounting component.

11. The inflatable airbag cushion assembly of claim 8, wherein the mounting component is a hook.

12. The inflatable airbag cushion assembly of claim 11, wherein the stabilizer strap comprises an aperture that is received by the mounting component.

13. The inflatable airbag cushion assembly of claim 12, wherein the stabilizer strap comprises a loop of material.

14. The inflatable airbag cushion assembly of claim 8, wherein the mounting component for coupling the stabilizer strap to the airbag housing is located on an outside portion of the airbag housing.

15. The inflatable airbag cushion assembly of claim 14, wherein the mounting component for the stabilizer strap comprises a member that extends from the airbag housing.

16. The inflatable airbag cushion assembly of claim 15, wherein the member that extends from the airbag housing comprises a tab.

17. The inflatable airbag cushion assembly of claim 8, wherein the stabilizer strap is coupled to the airbag cushion by stitching.

18. The airbag cushion assembly of claim 17, wherein a lower-most portion of the stitching, relative to the inflator mounting area, is aligned with each of the centers of the inflator insert aperture and the inflator mounting stem aperture.

19. The airbag assembly of claim 8, wherein the stabilizer strap prevents the airbag cushion, during inflatable airbag cushion deployment, from rotating around the inflator attachment area, relative to the longitudinal axis of the airbag housing.

20. The airbag assembly of claim 19, wherein the inflator insert aperture has a larger diameter than the inflator mounting stem aperture to permit the inflator to be inserted into the airbag cushion via the inflator insert aperture.

21. A method for coupling an inflator to an inflatable airbag cushion comprising the steps of:
providing an inflatable airbag cushion having a stabilizer strap, an inflator insert aperture, and an inflator mounting stem aperture;
providing an inflator that comprises a first end and a second end as well as a first mounting stem and a second mounting stem, wherein each of the mounting stems protrude perpendicularly away from a body of the inflator;
providing an airbag housing for the inflatable airbag cushion, wherein the airbag housing comprises at least one mounting component for the stabilizer strap, a first inflator mounting stem aperture, and a second inflator mounting stem aperture, wherein each of the mounting stem apertures are configured to receive one of the inflator mounting stems, and wherein the at least one mounting component for the stabilizer strap comprises an aperture in the airbag housing, wherein the aperture is configured such that the stabilizer strap can protrude through the aperture;

inserting the first end of the inflator into the inflator insert aperture of the inflatable airbag cushion;

inserting the first mounting stem of the inflator into the inflator insert aperture such that the inflator is partially located within an inflatable void of the airbag cushion;

aligning the first mounting stem of the inflator with the inflator mounting stem aperture of the inflatable airbag cushion;

inserting the first mounting stem of the inflator through the inflator mounting stem aperture in the inflatable airbag cushion;

inserting the first mounting stem through the first mounting stem aperture in the airbag housing;

inserting the second mounting stem through the second mounting stem aperture in the airbag housing;

coupling the stabilizer strap to the airbag housing for the inflatable airbag cushion;

securing the inflator to the airbag housing.

22. The method of claim 21, wherein the steps of inserting the first mounting stem through the first aperture in the airbag housing and inserting the second mounting stem through the second aperture in the airbag housing are performed simultaneously.

23. The method of claim 21, further comprising a step of threading the stabilizer strap on the airbag cushion through the aperture for the stabilizer strap in the airbag housing.

24. The method of claim 23, wherein the at least one mounting component for the stabilizer strap further comprises an extension.

25. The method of claim 24, further comprising the step of coupling the stabilizer strap to the extension.

26. The method of claim 25, wherein the aperture is defined by a loop in the stabilizer strap.

27. The method of claim 26, further comprising the step of placing the aperture on the extension.

28. The method of claim 24, wherein the aperture is defined by an aperture in a body portion of the stabilizer strap.

29. The method of claim 28, further comprising the step of placing the aperture on the extension.

30. The method of claim 21, wherein the step of securing the inflator to the airbag housing comprises securing each of the first and second inflator mounting stems to the airbag housing.

* * * * *